(12) United States Patent
Yan et al.

(10) Patent No.: US 9,219,622 B2
(45) Date of Patent: Dec. 22, 2015

(54) METHOD AND APPARATUS FOR COMPENSATING NONLINEAR DAMAGE

(75) Inventors: Weizhen Yan, Beijing (CN); Zhenning Tao, Beijing (CN); Takeshi Hoshida, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 893 days.

(21) Appl. No.: 13/412,096

(22) Filed: Mar. 5, 2012

(65) Prior Publication Data

US 2013/0230313 A1 Sep. 5, 2013

(30) Foreign Application Priority Data

Mar. 4, 2011 (CN) .......................... 2011 1 0052917

(51) Int. Cl.
*H04B 10/18* (2006.01)
*H04L 25/02* (2006.01)
*H04B 10/69* (2013.01)

(52) U.S. Cl.
CPC ........ *H04L 25/0202* (2013.01); *H04B 10/6971* (2013.01)

(58) Field of Classification Search
CPC ............... H04B 10/2543; H04B 10/58; H04B 10/6163; H04B 10/6166
USPC ....................................................... 398/209
See application file for complete search history.

(56) References Cited

U.S. PATENT DOCUMENTS

| | | | | |
|---|---|---|---|---|
| 3,735,266 A * | 5/1973 | Amitay | ................... | H04B 7/002 327/552 |
| 7,684,712 B1 * | 3/2010 | Roberts | ................... | H04B 10/60 375/341 |
| 8,805,207 B2 * | 8/2014 | Tanimura | ................... | H03F 3/08 398/159 |
| 8,923,708 B2 * | 12/2014 | Tanimura | ............. | H04B 10/613 398/209 |
| 2004/0028412 A1 * | 2/2004 | Murphy | ............... | H04B 10/801 398/135 |
| 2006/0013296 A1 * | 1/2006 | Carrer | ............... | H04L 25/03063 375/232 |
| 2006/0013597 A1 * | 1/2006 | Crivelli | .............. | H04B 10/6971 398/208 |
| 2009/0214215 A1 * | 8/2009 | Li | ....................... | H04B 10/2507 398/81 |
| 2009/0245809 A1 * | 10/2009 | Nakamoto | ......... | H04B 10/2507 398/159 |
| 2009/0297153 A1 * | 12/2009 | Mutalik | ................. | H04B 10/58 398/81 |
| 2009/0324224 A1 * | 12/2009 | Xie | ........................ | H04B 10/60 398/65 |
| 2010/0014873 A1 * | 1/2010 | Bulow | ............... | H04B 10/6161 398/159 |
| 2010/0104284 A1 * | 4/2010 | Liu | ........................ | H04J 14/06 398/65 |

(Continued)

FOREIGN PATENT DOCUMENTS

| | | |
|---|---|---|
| CN | 101442365 | 5/2009 |
| CN | 101453269 | 6/2009 |

OTHER PUBLICATIONS

Chinese Office Action issued Jun. 4, 2013 in corresponding Chinese Application No. 201110052917.2.

(Continued)

*Primary Examiner* — David Payne
*Assistant Examiner* — Tanya Motsinger
(74) *Attorney, Agent, or Firm* — Staas & Halsey LLP

(57) ABSTRACT

The embodiments relate to a method and an apparatus for compensating nonlinear damage. The method and apparatus being used in a dual-polarization communication system, the method comprising: calculating, according to input time-domain signals, a plurality of multiplicative parameters indicative of nonlinear damages to the input signals; constructing a plurality of multiplicators by using the plurality of multiplicative parameters; and compensating the input time-domain signals by using the plurality of multiplicators.

13 Claims, 20 Drawing Sheets

(56) References Cited

U.S. PATENT DOCUMENTS

| | | | | |
|---|---|---|---|---|
| 2010/0239254 A1* | 9/2010 | Li | .................. | H04B 10/2507 398/65 |
| 2011/0135319 A1* | 6/2011 | Youn | .................. | H04B 10/6971 398/202 |
| 2012/0082468 A1* | 4/2012 | Qian | .................. | H04B 10/2543 398/188 |
| 2012/0170929 A1* | 7/2012 | Xie | .................. | H04B 10/07951 398/33 |
| 2012/0301146 A1* | 11/2012 | Mateo | .................. | H04B 10/6163 398/65 |
| 2013/0108260 A1* | 5/2013 | Yan | .................. | H04B 10/2543 398/25 |
| 2013/0230312 A1* | 9/2013 | Randel | .................. | H04B 10/611 398/25 |
| 2013/0230313 A1* | 9/2013 | Yan | .................. | H04L 25/0202 398/25 |
| 2013/0287390 A1* | 10/2013 | Abe | .................. | H03H 17/0202 398/26 |
| 2013/0336654 A1* | 12/2013 | Arikawa | .................. | H04B 10/614 398/65 |
| 2014/0086594 A1* | 3/2014 | Xie | .................. | H04B 10/6161 398/208 |
| 2014/0199068 A1* | 7/2014 | Kaneda | .................. | H04B 10/6166 398/65 |

OTHER PUBLICATIONS

Extended European Search Report dated Jul. 20, 2012 issued in corresponding European Patent Application No. 12150909.5.

Takeshi Hoshida et al., "Recent Progress on Nonlinear Compensation Technique in Digital Coherent Receiver", Optical Fiber Communication/National Fiber Optic Engineers 2010 Conference, Mar. 2010, pp. 1-3.

Lei Li et al., "Nonlinear Polarization Crosstalk Canceller for Duel-Polarization Digital Coherent Receivers", Optical Fiber Communication/National Fiber Optic Engineers 2010 Conference, Mar. 2010, pp. 1-3.

Marco Mussolin et al., "DSP-based compensation of non-linear impairments in 100 GB/s PolMux QPSK", 12th International Conference on Transparent Optical Networks (ICTON), Jun. 2010, pp. 1-4.

Chinese Decision of Rejection mailed Dec. 2, 2013 in corresponding Chinese Patent Application No. 201110052917.2.

Xing Wei, "Power-weighted dispersion distribution function for characterizing nonlinear properties of long-haul optical transmission links", Optics Letters, vol. 31, No. 17, Sep. 2006, pp. 2544-2546.

Shoichiro Oda et al., "112 Gb/s DP-QPSK Transmission Using a Novel Nonlinear Compensator in Digital Coherent Receiver", OSA/OFC/NFOEC, 2009, pp. 1-3.

Antonio Mecozzi et al., "Analysis of Intrachannel Nonlinear Effects in Highly Dispersed Optical Pulse Transmission", IEEE Photonics Technology Letters, vol. 12, No. 4, Apr. 2000, pp. 392-394.

Lei Li et al., "Implementation Efficient (0.25 stage/span) Nonlinear Equalizer Based on Digital Backpropagation of Multi-span Uncompensated Link", pp. 1-3.

Ezra Ip et al., "Compensation of Dispersion and Nonlinear Impairments Using Digital Backpropagation", Journal of Lightwave Technology, vol. 26, No. 20, Oct. 2008, pp. 3416-3425.

Chinese Office Action issued Jan. 16, 2013, in corresponding Chinese Patent Application No. 201110052917.2.

Chinese Office Action dated Feb. 2, 2015 in corresponding Chinese Patent Application No. 201110052917.2.

Chinese Office Action dated Aug. 4, 2015 in corresponding Chinese Patent Application No. 201110052917.2.

* cited by examiner

METHOD AND APPARATUS FOR COMPENSATING NONLINEAR DAMAGE

CROSS REFERENCE TO RELATED APPLICATIONS

This application claims the benefit of Chinese Application No. 201110052917.2, filed Mar. 4, 2011, the disclosure of which is incorporated herein by reference.

FIELD OF THE INVENTION

The embodiments relate to coherent optical communication, and particularly, to compensation of nonlinear damage of polarized coherent optical communication system.

DESCRIPTION OF THE RELATED ART

The phase noise and the waveform damage caused by the self-phase modulation (SPM) or the intra-channel nonliearity are one of the main origins of the cost of the long distance propagation optical communication system. In coherent optical communication system, the nonlinear damage of the SPM can be compensated by using a digital back-propagation (BP) unit of the coherent receiver. Similarly, a nonlinear compensation for the BP can also be used in a transmitter, so as to eliminate the nonlinear damage caused by the optical fiber transmission link.

FIG. 1 schematically illustrates a block diagram of a receiver using a BP technology. As illustrated in FIG. 1, in the receiver using the BP technology, a BP unit performs a BP processing of a signal processed by a front-end. Since the BP unit is mainly used for the nonlinear compensation, it is also called as an apparatus for compensating nonlinear damage herein. One receiver usually includes several BP units connected in series (illustrated as xM in the drawing, i.e., BP units of M stages). As illustrated in FIG. 1, each stage of BP unit includes a chromatic dispersion compensator (CDC) configured to compensate a linear damage, i.e., the chromatic dispersion damage, and a nonlinear compensator (NLC) configured to compensate a nonlinear damage, i.e., the SPM damage. Other components in the receiver as shown in FIG. 1 for equalization, polarization demultiplexing, frequency difference compensation, phase recovery, and data recovery are all known in the art, and about their structures please refer to Chinese patent applications "Apparatus and Method for Compensating Frequency Difference and Coherent Optical Receiver" (inventor: Lei L I; application No.: 200710196347.8) and "Apparatus and Method for Phase Estimation" (inventor: Zhenying TAO; application No.: 200710188795.3). The two patents are incorporated herein by reference, as if they were completely described herein.

FIG. 2 illustrates the structure of a nonlinear compensator (NLC). As illustrated in FIG. 2, the NLC is composed of two parts, i.e., a nonlinear damage calculator configured to calculate various nonlinear damages, and a nonlinear damage eliminator configured to eliminate the nonlinear damage in a signal by using an output from the nonlinear damage calculator.

FIG. 3 illustrates the structure of a nonlinear damage calculator in a conventional nonlinear compensator (NLC). The sum of the instantaneous power of a signal is taken as the magnitude of the nonlinear damage and marked as $\phi(t)$. FIG. 4 illustrates the structure of a nonlinear damage eliminator in a traditional nonlinear compensator (NLC). After an exponential operation, the nonlinear damage $\phi(t)$ calculated in FIG. 3 is multiplied with X and Y polarization states of the signal, respectively, so as to eliminate the nonlinear damage. As the nonlinear damage is finally eliminated through a multiplicative operation, the $\phi(t)$ can be called as a multiplicative parameter.

FIG. 5 illustrates the structure of an improved conventional nonlinear damage calculator. After a weighted average, the sum of the instantaneous power of a signal is taken as the magnitude of the nonlinear damage. The magnitude of the nonlinear damage calculated by the nonlinear damage calculator may be eliminated by the nonlinear damage eliminator as illustrated in FIG. 4.

The disadvantage of these conventional BP methods is that the accuracy is not high and too many stages are required. Thus the methods cannot be implemented in the practical polarization communication system.

Literatures helpful to understand the embodiments are listed as follows, which are incorporated herein by reference, as if they were completely described herein.
1. Ezra Ip, JLT, vol 26, no 20, pp 3416 (2008);
2. Shoichiro Oda, OFC2009, paper OThR6;
3. X. Wei, Opt. Lett., vol 31, no 17, pp 2544 (2006);
4. A. Mecozzi, PTL, vol 12, no 4, pp 392 (2000);
5. Lei Li, OFC2011, paper OWW3.

SUMMARY

The embodiments are proposed in view of the above problems in the prior art, so as to eliminate or relieve one or more problems caused by limitations and disadvantages of the conventional technology, and provide at least one beneficial selection.

In order to achieve the above object, a method for compensating nonlinear damage is provided according to an aspect, the method being used in a dual-polarization communication system, the method including: calculating, according to input time-domain signals, a plurality of multiplicative parameters indicative of nonlinear damages to the input signals; constructing a plurality of multiplicators by using the plurality of multiplicative parameters; delaying the input time-domain signals; and compensating the delayed input time-domain signals using the plurality of multiplicators.

An apparatus for compensating nonlinear damage according to another aspect is provided, the apparatus being used in a dual-polarization communication system and the apparatus including: a multiplicative parameter calculating unit configured to calculate a plurality of multiplicative parameters according to input time-domain signals, the multiplicative parameters being parameters indicative of nonlinear damages to the input signals; a multiplicator constructing unit configured to construct a plurality of multiplicators by using the plurality of multiplicative parameters; a delaying unit configured to delay the input time-domain signals; and a compensating unit configured to compensate the delayed input time-domain signals using the plurality of multiplicators.

The embodiments provide a method and apparatus for nonlinear compensation for time domain and polarization combined processing. Through constructing multiplicators by calculating multiplicative parameters in each stage of BP unit, the BP units of fewer stages may be used while providing the same performance, so that the complexity is further decreased.

To be noted, the term "include/comprise" or "including/comprising" herein refers to the existence of feature, component, step or assembly, not excluding the existence or addition of one or more other features, components, steps or assemblies.

The above general description and the following detailed descriptions in conjunction with the drawings are just exemplary, instead of limitations to the protection scope.

BRIEF DESCRIPTION OF THE DRAWINGS

The above and other objects, features and advantages can be understood more clearly based on the following detailed descriptions with reference to the drawings. In the drawings.

DETAILED DESCRIPTION OF THE PREFERRED EMBODIMENTS

The embodiments will be detailedly described as follows in conjunction with the drawings. These drawings and descriptions are just exemplary, instead of limitations to the protection scope.

The method for calculating and eliminating nonlinear damage provided is suitable for, but not limited to, modulation formats such as mPSK, mQAM, mAPSK, etc. and subcarrier multiplexing or OFDM technology.

Figure 1:
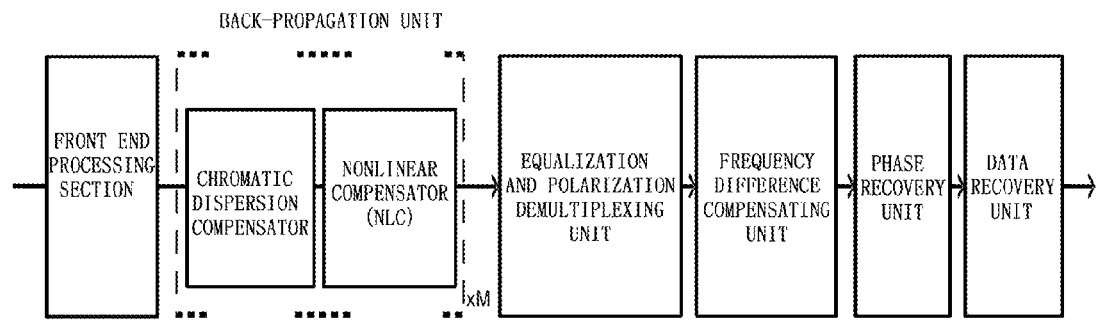
FIG. 1 schematically illustrates a block diagram of a receiver using a BP technology.
Figure 2:
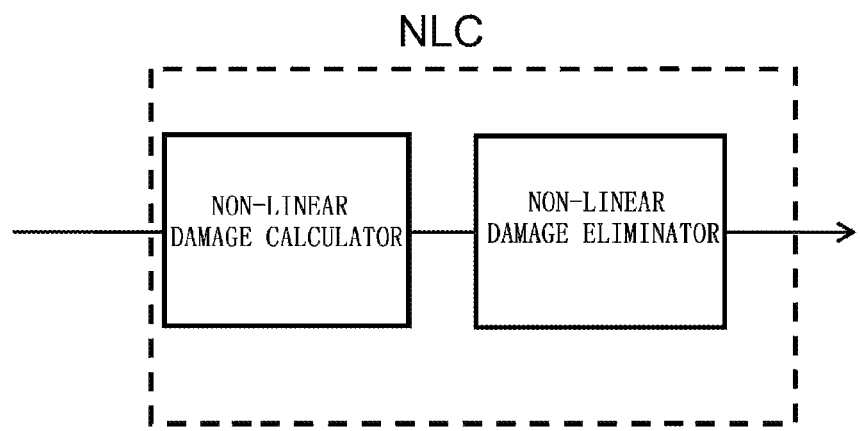
FIG. 2 illustrates the structure of a nonlinear compensator (NLC)
Figure 3:
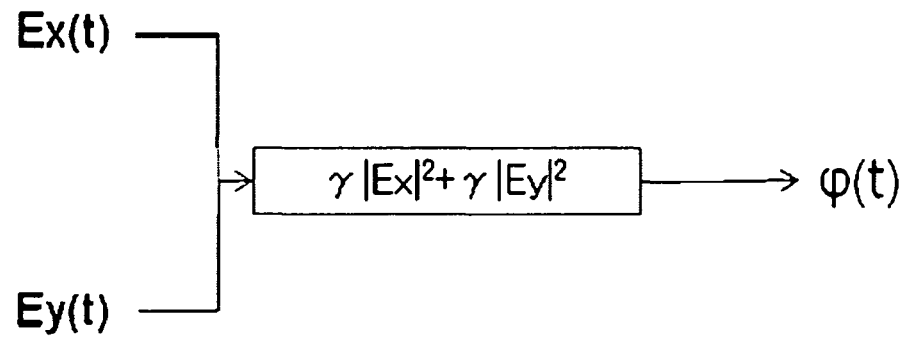
FIG. 3 illustrates the structure of a nonlinear damage calculator in a conventional nonlinear compensator (NLC)
Figure 4:
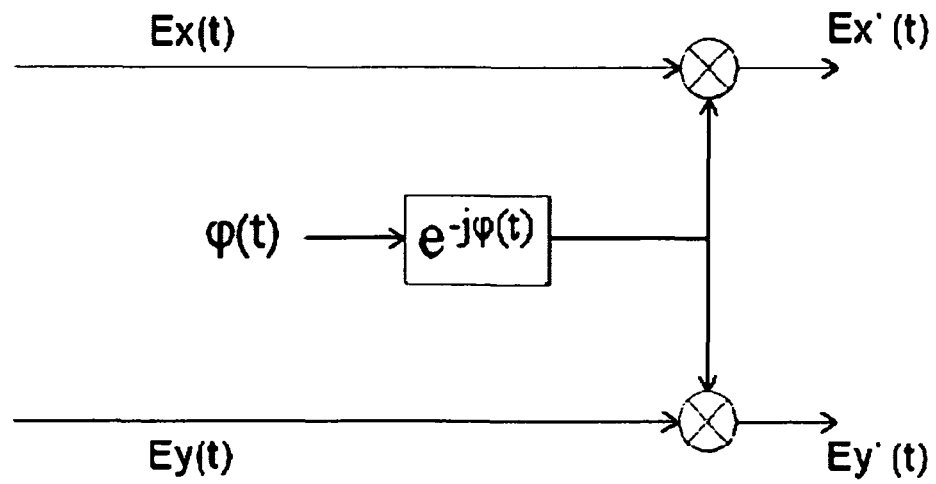
FIG. 4 illustrates the structure of a nonlinear damage eliminator in a traditional nonlinear compensator (NLC)
Figure 5:
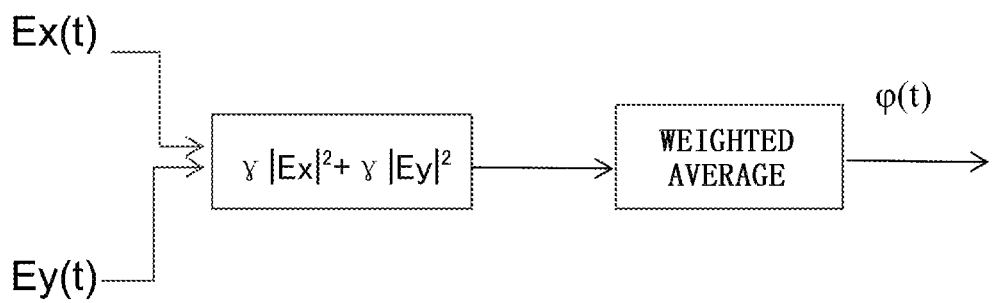
FIG. 5 illustrates the structure of an improved conventional nonlinear damage calculator.
Figure 6:
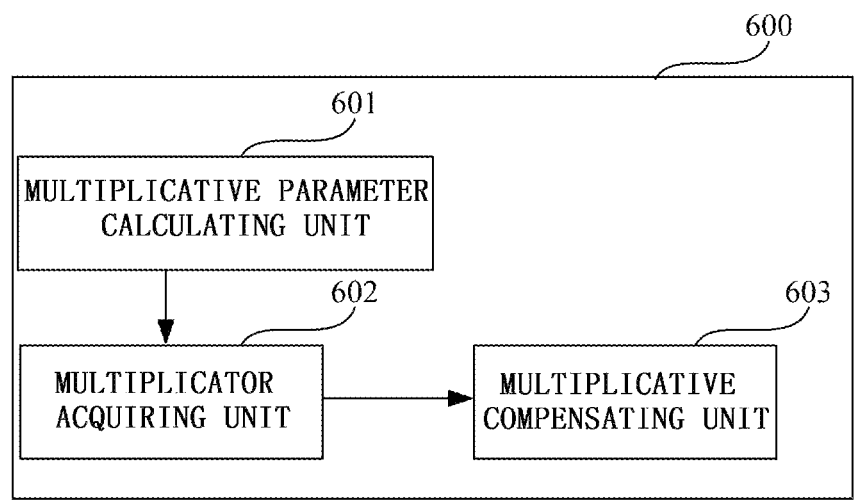
FIG. 6 illustrates a schematic structural block diagram of a nonlinear compensator according to a first embodiment.

FIG. 6 illustrates a schematic structural block diagram of a nonlinear compensator according to a first embodiment. As illustrated in FIG. 6, a nonlinear compensator 600 includes a multiplicative parameter calculating unit 601, a multiplicator acquiring unit 602 and a multiplicative compensating unit 603.

The multiplicative parameter calculating unit 601 calculates a plurality of multiplicative parameters according to time-domain signals (also called input signals) having undergone a front end processing and a chromatic dispersion compensation performed by a Chromatic Dispersion Compensator (CDC) of the stage. The multiplicator acquiring unit 602 constructs a plurality of multiplicators by using the plurality of multiplicative parameters. The multiplicative compensating unit 603 compensates the input signals by using the plurality of multiplicators. The multiplicative parameter calculating unit 601 corresponds to the nonlinear damage calculator.

The multiplicative parameter calculating unit 601 is described as follows, and it is also called as a nonlinear distortion calculator.

Figure 7:
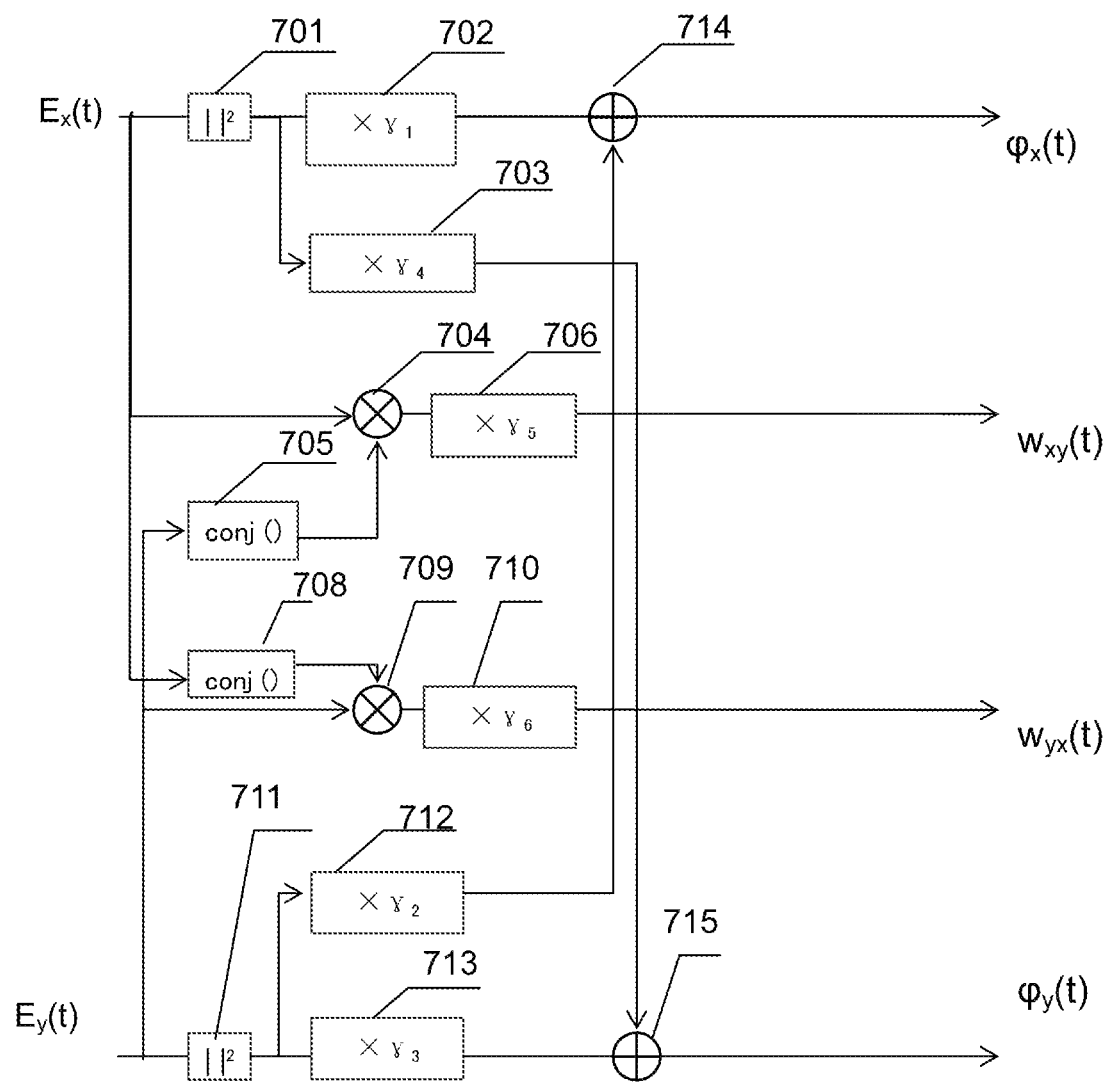
FIG. 7 illustrates a schematic diagram of a multiplicative parameter calculating unit according to an embodiment.

FIG. 7 illustrates a schematic diagram of a multiplicative parameter calculating unit 601 according to an embodiment.

As illustrated in FIG. 7, a first polarization signal Ex(t) is input to a power calculator 701, which calculates a modulus of the signal and squares the modulus, so as to acquire the power of the first polarization signal. The power of the first polarization signal is input to a multiplier 702, in which it is multiplied by a first nonlinear coefficient $\gamma 1$, and a multiplication result is input to an adder 714. Meanwhile, a second polarization signal Ey(t) is input to a power calculator 711, which calculates a modulus of the signal and squares the modulus, so as to acquire the power of the second polarization signal. The power of the second polarization signal is input to a multiplier 712, in which it is multiplied by a second nonlinear coefficient $\gamma 2$, and a multiplication result is input to the adder 714. The adder 714 adds the multiplication results of the multipliers 702 and 712 to acquire a first multiplicative parameter indicative of the damage to the signal under a first polarization state, which can be called a multiplicative parameter for phase damage under a first polarization state, and also referred to as a first phase damage multiplicative parameter herein for the convenience of description.

On another hand, the power of the second polarization signal (i.e., the output of the power calculator 711) is further output to a multiplier 713, in which it is multiplied by a third nonlinear coefficient $\gamma 3$, and a multiplication result is input to an adder 715. The power of the first polarization signal is further output to a multiplier 703, in which it is multiplied by a fourth nonlinear coefficient $\gamma 4$, and a multiplication result is input to the adder 715. The adder 715 adds the multiplication results of the multipliers 703 and 713 to acquire a second multiplicative parameter indicative of the damage to the signal under a second polarization state, which can be called a multiplicative parameter for phase damage under a second polarization state, and also referred to as a second phase damage multiplicative parameter herein for the convenience of description.

On another hand, the first polarization signal Ex(t) is further input to a multiplier 704. At the same time, the second polarization signal Ey(t) is input to a conjugator 705, which conjugates the second polarization signal and inputs a conjugation thereof to the multiplier 704. In the multiplier 704, the first polarization signal is multiplied by the conjugation of the second polarization signal, and a multiplication result is input to a multiplier 706, where the multiplication result is multiplied by a fifth nonlinear coefficient γ5 to acquire a third multiplicative parameter Wxy(t) indicative of the crosstalk to the signal under the first polarization state by the signal under second polarization state, which can be called a multiplicative parameter for polarization crosstalk from the second polarization state to the first polarization state, and also referred to as a first crosstalk multiplicative parameter herein for the convenience of description.

On another hand, the first polarization signal Ex(t) is further input to a conjugator 708, which conjugates the first polarization signal and inputs a conjugation thereof to a multiplier 709. At the same time, the second polarization signal Ey(t) is also input to the multiplier 709. In the multiplier 709, the second polarization signal is multiplied by the conjugation of the first polarization signal, and a multiplication result is input to a multiplier 710, where the multiplication result is multiplied by a sixth nonlinear coefficient γ6 to acquire a fourth multiplicative parameter Wyx(t) indicative of the crosstalk to the signal under the second polarization state by the signal under the first polarization state, which is called a multiplicative parameter for polarization crosstalk from the first polarization state to the second polarization state, and also referred to as a second crosstalk multiplicative parameter herein for the convenience of description.

The phase damage multiplicative parameter and crosstalk multiplicative parameter are both parameters indicative of the nonlinear damage, thus they are also called nonlinear damage multiplicative parameters.

In a preferred embodiment, the first nonlinear coefficient γ1 is set to be the same as the third nonlinear coefficient γ3, the second nonlinear coefficient γ2 is set to be the same as the fourth nonlinear coefficient γ4, and/or the fifth nonlinear coefficient γ5 is set to be the same as the sixth nonlinear coefficient γ6. In a further preferred embodiment, the first nonlinear coefficient γ1 is set to be the sum of the second nonlinear coefficient γ2 and the fifth nonlinear coefficient γ5. Obviously, in that case, the second nonlinear coefficient γ2 equals to the sum of the fourth nonlinear coefficient γ4 and the sixth nonlinear coefficient γ6.

It shall be appreciated that FIG. 7 and the descriptions thereof are exemplary, instead of limitations to the scope. Various modifications to FIG. 7, such as exchanging the positions of the multipliers 704 and 706, can be reasonably conceived. Thus in the descriptions, sometimes the two multipliers for implementing a multiplication of three numbers are called a multiplication unit, e.g., the multipliers 704 and 706 are generally called a first multiplication unit, and the multipliers 709 and 710 are generally called a second multiplication unit.

ϕx(t) sometimes is marked as ϕ$_x$, and ϕ$_y$(t) sometimes is marked as ϕ$_y$.

Figure 8:
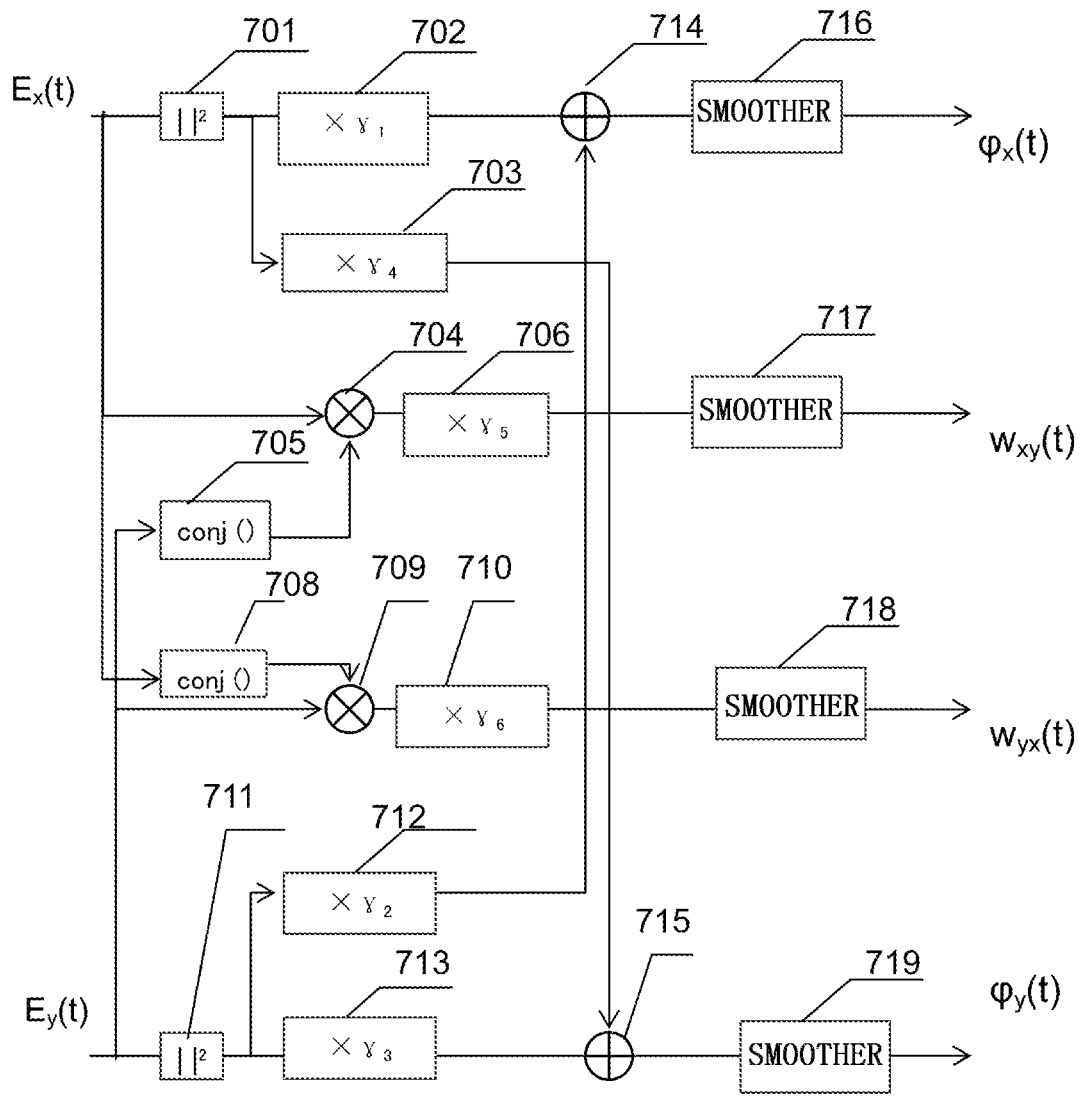
FIG. 8 illustrates a schematic diagram of a multiplicative parameter calculating unit according to another embodiment.

FIG. 8 illustrates a schematic diagram of a multiplicative parameter calculating unit 601 according to another embodiment.

The multiplicative parameter calculating unit illustrated in FIG. 8 is substantially the same as that illustrated in FIG. 7, but the multiplicative parameters undergo smoothing processing by smoothers 716 to 719, respectively.

The smoother may be concretely implemented as a weighted averager, a digital filter (e.g., FIR filter, IIR filter, etc.), or a filter implemented in the frequency domain. The coefficient h(0,t) of the smoother may be pre-calculated according to the link condition, e.g., according to the literature A. Mecozzi, PTL, vol 12, no 4, pp 392 (2000) and X. Wei, Opt. Lett., vol 31, no 17, pp 2544 (2006).

Figure 9:
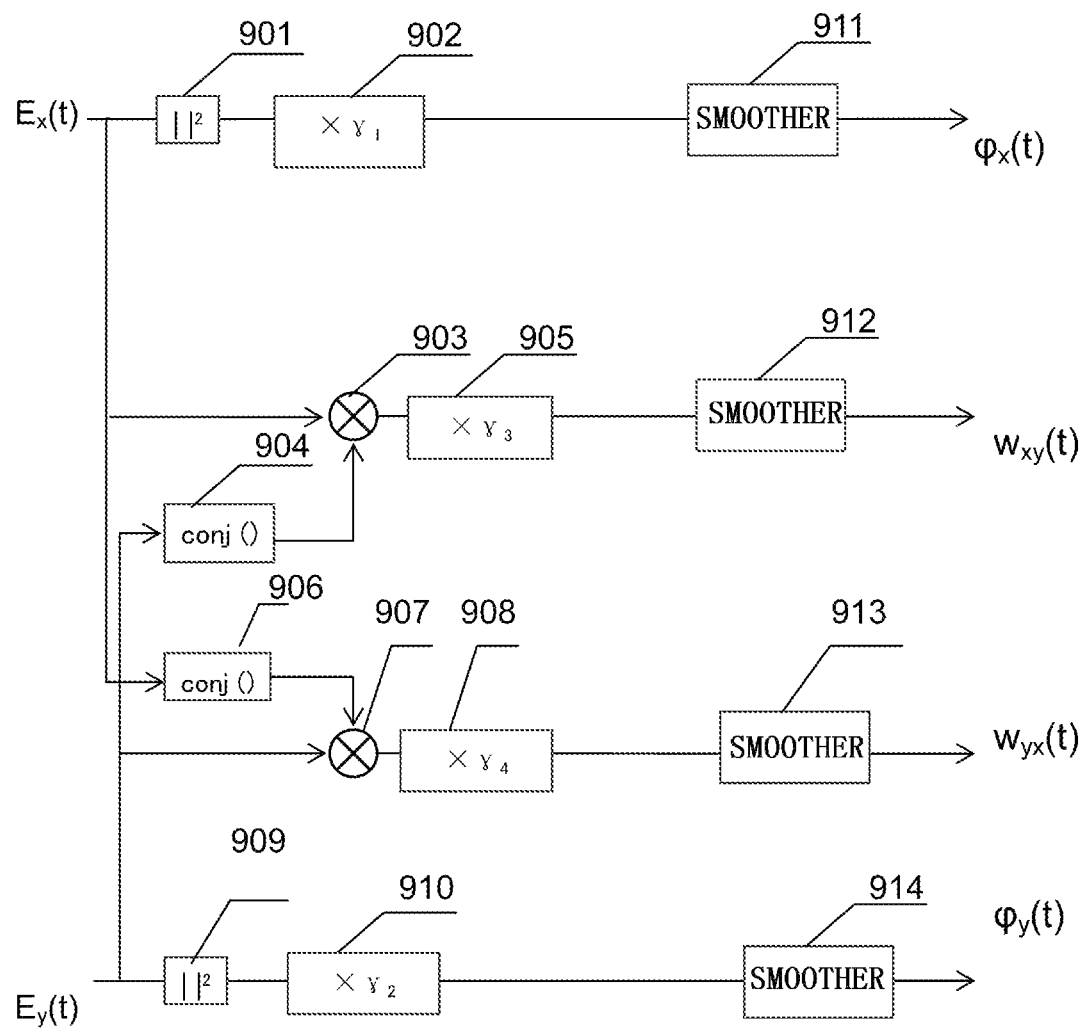
FIG. 9 illustrates a schematic diagram of a multiplicative parameter calculating unit according to still another embodiment.

FIG. 9 illustrates a schematic diagram of a multiplicative parameter calculating unit 601 according to still another embodiment.

As illustrated in FIG. 9, a first polarization signal Ex(t) is input to a power calculator 901, which calculates a modulus of the signal and squares the modulus, so as to acquire the power of the first polarization signal. The power of the first polarization signal is input to a multiplier 902, in which it is multiplied by a first nonlinear coefficient γ1, and a multiplication result is input to a smoother 911, in which it is smoothed, so as to acquire a first multiplicative parameter indicative of the damage to the signal under a first polarization state, which can be called a multiplicative parameter for phase damage under a first polarization state, and also referred to as a first phase damage multiplicative parameter herein for the convenience of description.

On another hand, a second polarization signal Ey(t) is input to a power calculator 909, which calculates a modulus of the signal and squares the modulus, so as to acquire the power of the second polarization signal. The power of the second polarization signal is input to a multiplier 910, in which it is multiplied by a second nonlinear coefficient γ2, and a multiplication result is input to a smoother 914, in which it is smoothed, so as to acquire a second multiplicative parameter indicative of the damage to the signal under a second polarization state, which can be called a multiplicative parameter for phase damage under a second polarization state, and also referred to as a second phase damage multiplicative parameter herein for the convenience of description.

On another hand, the first polarization signal Ex(t) is further input to a multiplier 903. At the same time, the second polarization signal Ey(t) is input to a conjugator 904, which conjugates the second polarization signal and inputs a conjugation thereof to the multiplier 903. In the multiplier 903, the first polarization signal is multiplied by the conjugation of the second polarization signal, and a multiplication result is input to a multiplier 905, in which it is multiplied by a third nonlinear coefficient γ3, then a multiplication result is smoothed by a smoother 912 to acquire a third multiplicative parameter Wxy(t) indicative of the crosstalk to the signal under the first polarization state by the signal under a second polarization state, which can be called a multiplicative parameter for polarization crosstalk from the second polarization state to the first polarization state, and also can be referred to as a first crosstalk multiplicative parameter herein for the convenience of description.

On another hand, the first polarization signal Ex(t) is further input to a conjugator 906, which conjugates the first polarization signal and inputs a conjugation thereof to a multiplier 907. At the same time, the second polarization signal Ey(t) is also input to the multiplier 907. In the multiplier 907, the second polarization signal is multiplied by the conjugation of the first polarization signal, and a multiplication result is input to a multiplier 908, where the multiplication result is multiplied by a fourth nonlinear coefficient γ4, and then smoothed by a smoother 913 to acquire a fourth multiplicative parameter Wyx(t) indicative of the crosstalk to the signal under the second polarization state by the signal under the first polarization state, which is called a multiplicative parameter for polarization crosstalk from the first polarization state to the second polarization state, and also referred to as a second crosstalk multiplicative parameter herein for the convenience of description.

In a preferred embodiment, the third nonlinear coefficient γ3 is set to be the same as the fourth nonlinear coefficient γ4.

In a further preferred embodiment, the first nonlinear coefficient γ1 and the second nonlinear coefficient γ2 are set to be larger than the fourth nonlinear coefficient γ4. Obviously, in that case, the first nonlinear coefficient γ1 and the second nonlinear coefficient γ2 are also larger than the third nonlinear coefficient γ3.

In a modified embodiment, the multipliers 902 and 910 may be omitted.

In another modified embodiment, the smoothers 911 to 914 may be omitted.

Figure 10:
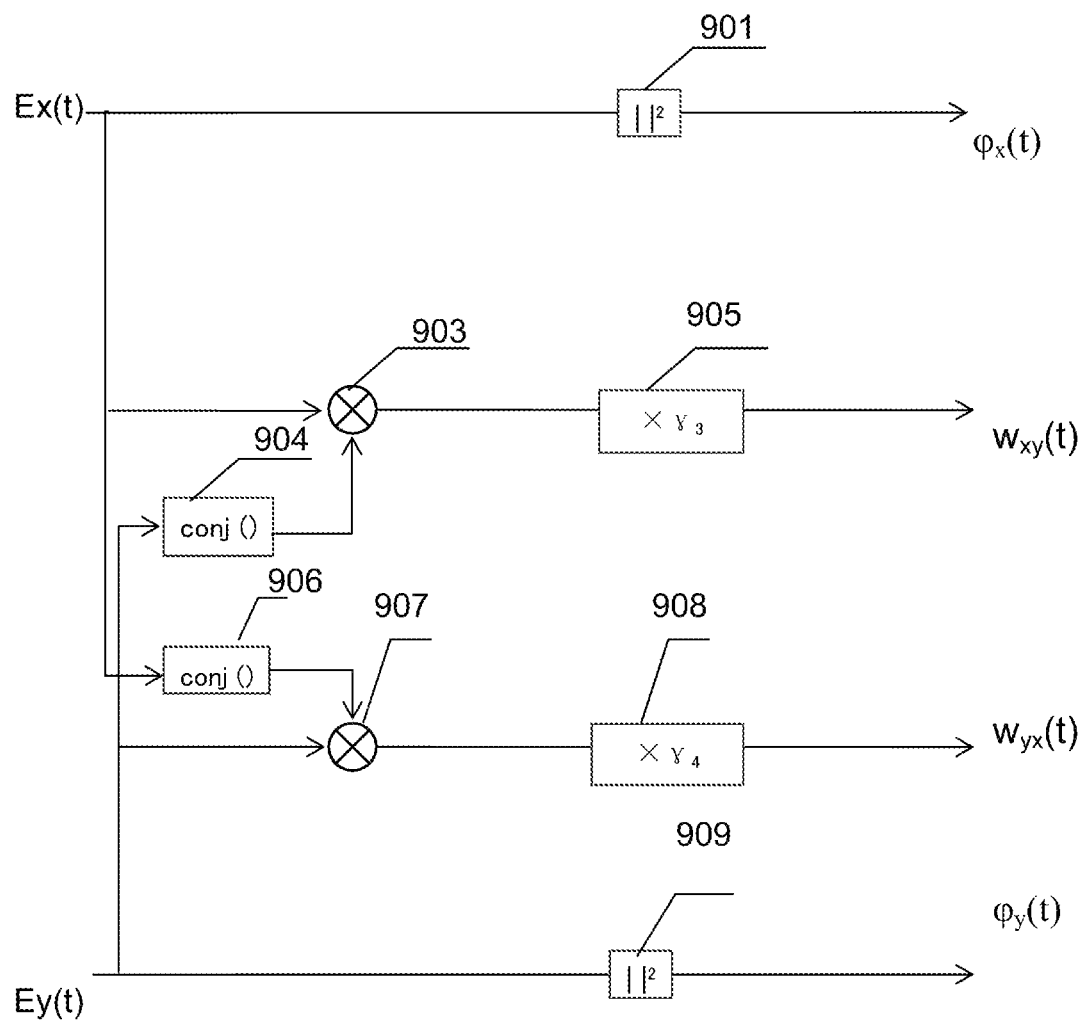
FIG. 10 illustrates a modification of the multiplicative parameter calculating unit illustrated in FIG. 9.

FIG. 10 illustrates a modification of the multiplicative parameter calculating unit 601 illustrated in FIG. 9. Obviously, in the modification illustrated in FIG. 10, the multipliers 902 and 910 as well as the smoothers 911 to 914 are all omitted.

The conditions of calculating four multiplicative parameters are described as above, but they are not restrictive. According to the embodiments, more or less multiplicative parameters may also be calculated.

Figure 11:
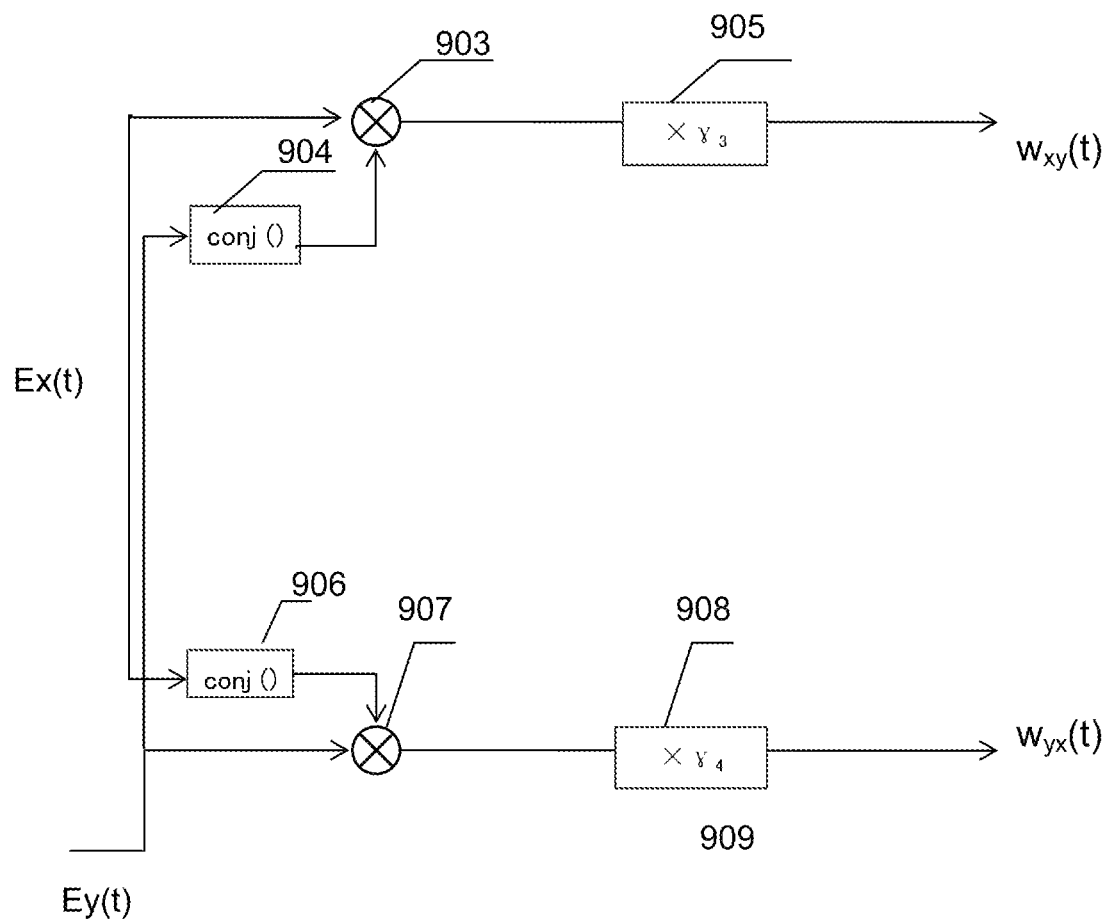
FIG. 11 illustrates a schematic diagram of a multiplicative parameter calculating unit according to still another embodiment.

FIG. 11 illustrates a schematic diagram of a multiplicative parameter calculating unit 601 according to still another embodiment.

As compared with the multiplicative parameter calculating units 601 illustrated in FIGS. 7 and 10, the multiplicative parameter calculating unit 601 illustrated in FIG. 11 does not calculate the first or second phase damage multiplicative parameter.

Obviously, the multiplicative parameter calculating unit of FIG. 11 may be provided with two smoothers to smooth the two calculated crosstalk multiplicative parameters.

Figure 12:
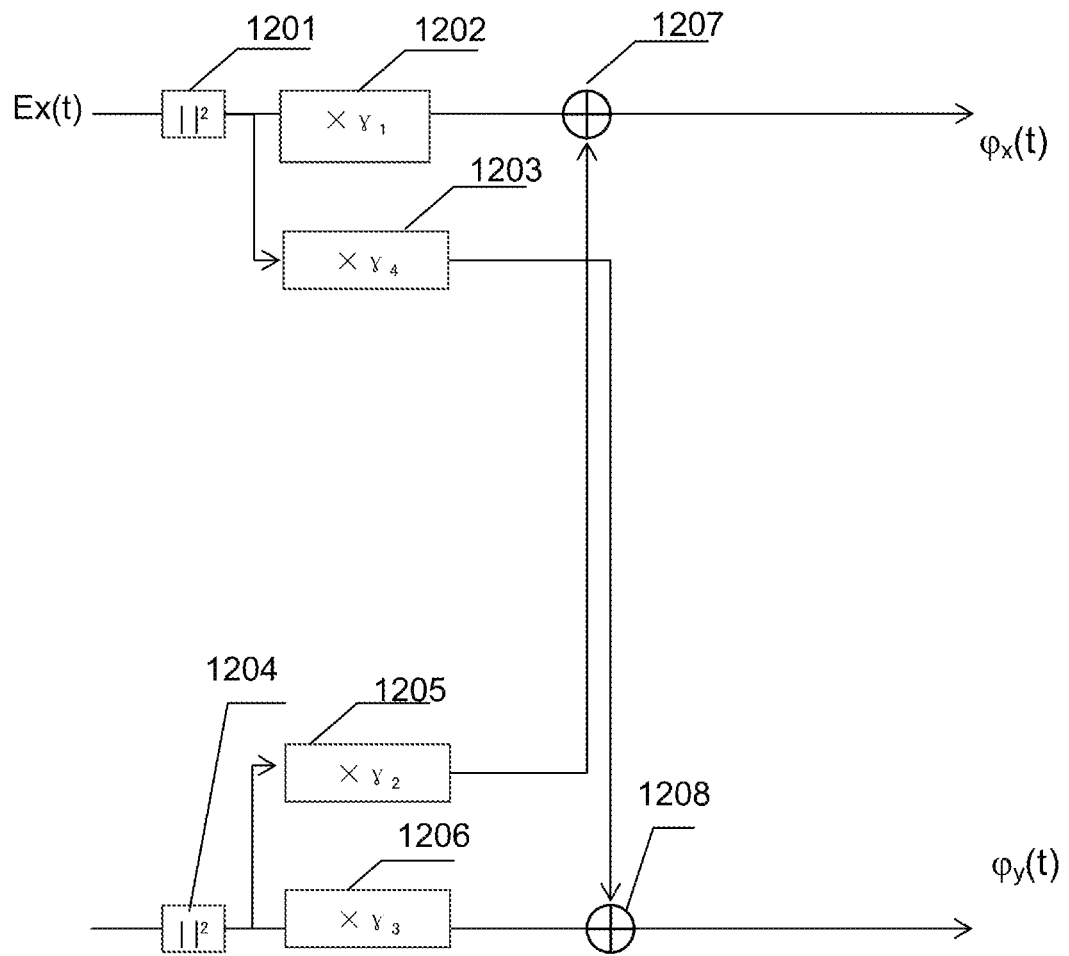
FIG. 12 illustrates a schematic diagram of a multiplicative parameter calculating unit according to still another embodiment.

FIG. 12 illustrates a schematic diagram of a multiplicative parameter calculating unit 601 according to still another embodiment.

As illustrated in FIG. 12, a first polarization signal Ex(t) is input to a power calculator 1201, which calculates a modulus of the signal and squares the modulus, so as to acquire the power of the first polarization signal. The power of the first polarization signal is input to a multiplier 1202, in which it is multiplied by a first nonlinear coefficient γ1, and a multiplication result is input to an adder 1207. Meanwhile, a second polarization signal Ey(t) is input to a power calculator 1204, which calculates a modulus of the signal and squares the modulus, so as to acquire the power of the second polarization signal. The power of the second polarization signal is input to a multiplier 1205, in which it is multiplied by a second nonlinear coefficient γ2, and a multiplication result is input to the adder 1207. The adder 1207 adds the multiplication results of the multipliers 1202 and 1205 to acquire a first multiplicative parameter, i.e., a first phase damage multiplicative parameter φx(t).

On another hand, the power of the second polarization signal is further output to a multiplier 1206, in which it is multiplied by a third nonlinear coefficient γ3, and a multiplication result is input to an adder 1208. The power of the first polarization signal is further output to a multiplier 1203, in which it is multiplied by a fourth nonlinear coefficient γ4, and a multiplication result is input to the adder 1208. The adder 1208 adds the multiplication results of the multipliers 1206 and 1203 to acquire a second multiplicative parameter, i.e., a second phase damage multiplicative parameter φy(t).

The multiplicative parameter calculating unit illustrated in FIG. 12 does not calculate the first or second crosstalk multiplicative parameter.

Obviously, the multiplicative parameter calculating unit of FIG. 12 may be provided with two smoothers to smooth two calculated phase damage multiplicative parameters.

In a preferred embodiment, the first nonlinear coefficient is the same as the third nonlinear coefficient, while the second nonlinear coefficient is the same as the fourth nonlinear coefficient. Further, the first and third nonlinear coefficients are larger than the second or fourth nonlinear coefficient.

In the above embodiments, none of the coefficients is zero.

A first phase damage multiplicative parameter calculating unit is constructed by the hardware concerned in calculating the first phase damage multiplicative parameter, such as the power calculator (701, 901), the multiplier (702, 712, 902), the adder (714), the smoother (716, 911), etc.

Similarly, a second phase damage multiplicative parameter calculating unit is constructed by the hardware concerned in calculating the second phase damage multiplicative parameter. A first crosstalk multiplicative parameter calculating unit is constructed by the hardware concerned in calculating the first crosstalk multiplicative parameter. A second crosstalk multiplicative parameter calculating unit is constructed by the hardware concerned in calculating the second crosstalk multiplicative parameter.

When the above multiplicative parameters are calculated, some are calculated by using a method of polarization combined, i.e., the signals under two polarization states are used during the calculation of the multiplicative parameter. Preferably, each of the multiplicative parameters is calculated by using the signals under two polarization states. Particularly, the first and second crosstalk multiplicative parameters can be calculated by using the signals under two polarization states, respectively.

The multiplicator acquiring unit 602 and the multiplicative compensating unit 603 are described as follows.

Figure 13:
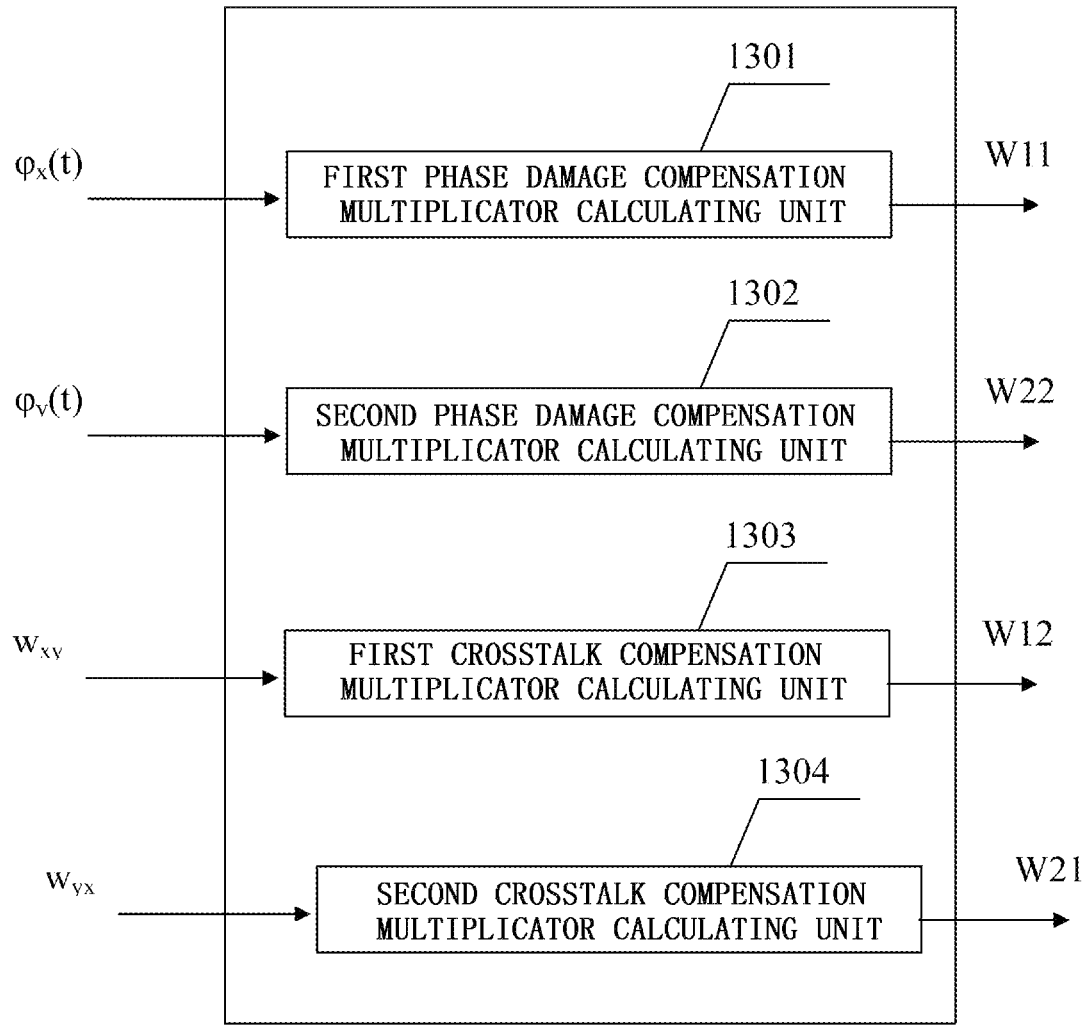
FIG. 13 illustrates a schematic diagram of a multiplicator acquiring unit according to an embodiment.

FIG. 13 illustrates a schematic diagram of a multiplicator acquiring unit 602 according to an embodiment.

In FIG. 13, a schematic diagram of the multiplicator acquiring unit 602 in case the multiplicative parameter calculating units calculate the four multiplicative parameters is illustrated.

As illustrated in FIG. 13, a first phase damage compensation multiplicator calculating unit 1301 calculates a first phase damage compensation multiplicator as a first multiplicator w11 according to a first phase damage multiplicative parameter φx(t). A second phase damage compensation multiplicator calculating unit 1302 calculates a second phase damage compensation multiplicator as a second multiplicator w22 according to a second phase damage multiplicative parameter φy(t). A first crosstalk compensation multiplicator calculating unit 1303 calculates a first crosstalk compensation multiplicator as a third multiplicator w12 according to a first crosstalk multiplicative parameter wxy. A second crosstalk compensation multiplicator calculating unit 1304 calculates a second crosstalk compensation multiplicator as a fourth multiplicator w21 according to a second crosstalk multiplicative parameter wyx.

The first phase damage compensation multiplicator calculating unit 1301, the second phase damage compensation multiplicator calculating unit 1302, the first crosstalk compensation multiplicator calculating unit 1303 and the second crosstalk compensation multiplicator calculating unit 1304 may perform their operations by using various algorithms.

In an embodiment, a phase damage compensation multiplicator is constructed by using the acquired phase damage multiplicative parameter through an exponential operation, and a crosstalk compensation multiplicator is constructed by using the acquired crosstalk multiplicative parameter through a multiplicative operation. Concretely, the first phase damage compensation multiplicator calculating unit 1301 acquires the first phase damage compensation multiplicator as the first multiplicator w11 through an equation $e^{-j\phi x}$. The second phase damage compensation multiplicator calculating unit 1302 acquires the second phase damage compensation multiplicator as the second multiplicator w22 through an equation $e^{-j\phi y}$. Through an equation $-jw_{xy}$, the first crosstalk compensation multiplicator calculating unit 1303 acquires the first crosstalk compensation multiplicator as the third multiplicator w12, i.e., a crosstalk compensation multiplicator of the signal under the second polarization state over the signal under the first polarization state. Through an equation −jwyx, the second crosstalk compensation multiplicator calculating unit 1304 acquires the second crosstalk compensation multiplicator as the fourth multiplicator w21, i.e., a crosstalk compensation multiplicator of the signal under the first polarization state over the signal under the second polarization state.

In another embodiment, the first phase damage compensation multiplicator calculating unit 1301 acquires the first phase damage compensation multiplicator as the first multiplicator w11 through an equation $1-\phi x$. The second phase damage compensation multiplicator calculating unit 1302 acquires the second phase damage compensation multiplicator as the second multiplicator w22 through an equation $1-\phi y$. Through an equation −jwxy, the first crosstalk compensation multiplicator calculating unit 1303 acquires the first crosstalk compensation multiplicator as the third multiplicator w12, i.e., a compensation multiplicator for crosstalk from the signal under the second polarization state to the signal under the first polarization state. Through an equation $-jw_{yx}$, the second crosstalk compensation multiplicator calculating unit 1304 acquires the second crosstalk compensation multiplicator as the fourth multiplicator w21, i.e., a compensation multiplicator for crosstalk from the signal under the first polarization state to the signal under the second polarization state.

In another embodiment, the first phase damage compensation multiplicator calculating unit 1301 acquires the first phase damage compensation multiplicator as the first multiplicator w11 through an equation $1-j\phi_x-\frac{1}{2}\phi_x^2$. The second phase damage compensation multiplicator calculating unit 1302 acquires the second phase damage compensation multiplicator as the second multiplicator w22 through an equation $1-j\phi_y-\frac{1}{2}\phi_y^2$. Through an equation $-jw_{xy}$, the first crosstalk compensation multiplicator calculating unit 1303 acquires the first crosstalk compensation multiplicator as the third multiplicator $w_{12}$, i.e., a compensation multiplicator for crosstalk from the signal under the second polarization state to the signal under the first polarization state. Through an equation $-jw_{yx}$, the second crosstalk compensation multiplicator calculating unit 1304 acquires the second crosstalk compensation multiplicator as the fourth multiplicator w21, i.e., a compensation multiplicator for crosstalk from the signal under the first polarization state to the signal under the second polarization state.

The above described algorithms are just exemplary, instead of limitations to the scope. For example, in case the equation $1-j\phi_x-\frac{1}{2}\phi_x^2$ is adopted, an item of higher order (e.g., an item having an exponent of 4) also may be calculated upon the actual request, so does the equation $1-j\phi_y-\frac{1}{2}\phi_y^2$.

Figure 14:
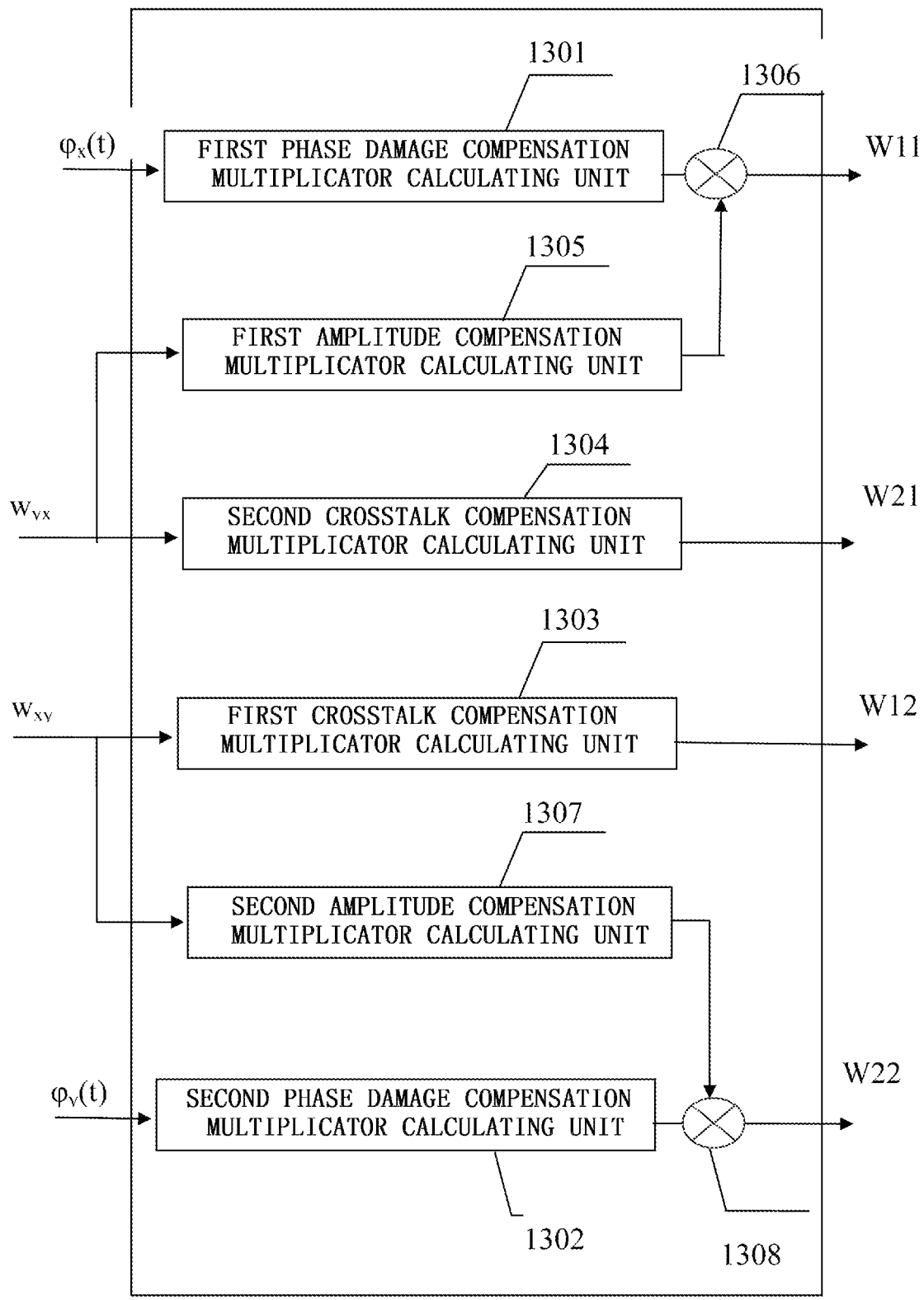
FIG. 14 illustrates a schematic diagram of a multiplicator acquiring unit according to another embodiment.

FIG. 14 illustrates a schematic diagram of a multiplicator acquiring unit 602 according to another embodiment.

As compared with the multiplicator acquiring unit 602 illustrated in FIG. 13, the multiplicator acquiring unit 602 illustrated in FIG. 14 further includes a first amplitude compensation multiplicator calculating unit 1305, a multiplier 1306, a second amplitude compensation multiplicator calculating unit 1307 and a multiplier 1308. Other parts are the same as those illustrated in FIG. 13, and herein are omitted.

The first amplitude compensation multiplicator calculating unit 1305 calculates a first amplitude compensation multiplicator according to a second crosstalk multiplicative parameter $w_{yx}$, and outputs the calculated first amplitude compensation multiplicator to the multiplier 1306. The multiplier 1306 multiplies the first phase damage compensation multiplicator from the first phase damage compensation multiplicator calculating unit 1301 with the first amplitude compensation multiplicator to acquire the first multiplicator w11. The second amplitude compensation multiplicator calculating unit 1307 calculates a second amplitude compensation multiplicator according to a first crosstalk multiplicative parameter $w_{xy}$, and outputs the calculated second amplitude compensation multiplicator to the multiplier 1308. The multiplier 1308 multiplies the second phase damage compensation multiplicator from the second phase damage compensation multiplicator calculating unit 1302 with the second amplitude compensation multiplicator to acquire the second multiplicator w22.

In an embodiment, the first amplitude compensation multiplicator calculating unit 1305 calculates the first amplitude compensation multiplicator according to the second crosstalk multiplicative parameter $w_{yx}$ through an equation $\sqrt{1-|w_{yx}|^2}$. The second amplitude compensation multiplicator calculating unit 1307 calculates the second amplitude compensation multiplicator according to the first crosstalk multiplicative parameter $w_{xy}$ through an equation $\sqrt{1-|w_{xy}|^2}$.

In another embodiment, the first amplitude compensation multiplicator calculating unit 1305 calculates the first amplitude compensation multiplicator according to the second crosstalk multiplicative parameter $w_{yx}$ through an equation $1-\frac{1}{2}|w_{yx}|^2-\frac{1}{8}|w_{yx}|^4$. The second amplitude compensation multiplicator calculating unit 1307 calculates the second amplitude compensation multiplicator according to the first crosstalk multiplicative parameter $w_{xy}$ through an equation $1-\frac{1}{2}|w_{xy}|^2-\frac{1}{8}|w_{xy}|^4$.

The above described algorithms are just exemplary, instead of limitations to the scope. For example, in case the equation $1-\frac{1}{2}|w_{yx}|^2-\frac{1}{8}|w_{yx}|^4$ is adopted, an item of higher order (e.g., an item having an exponent of 8) also may be calculated upon the actual request, so does the equation $1-\frac{1}{2}|w_{xy}|^2-\frac{1}{8}|w_{xy}|^4$.

Figure 15:
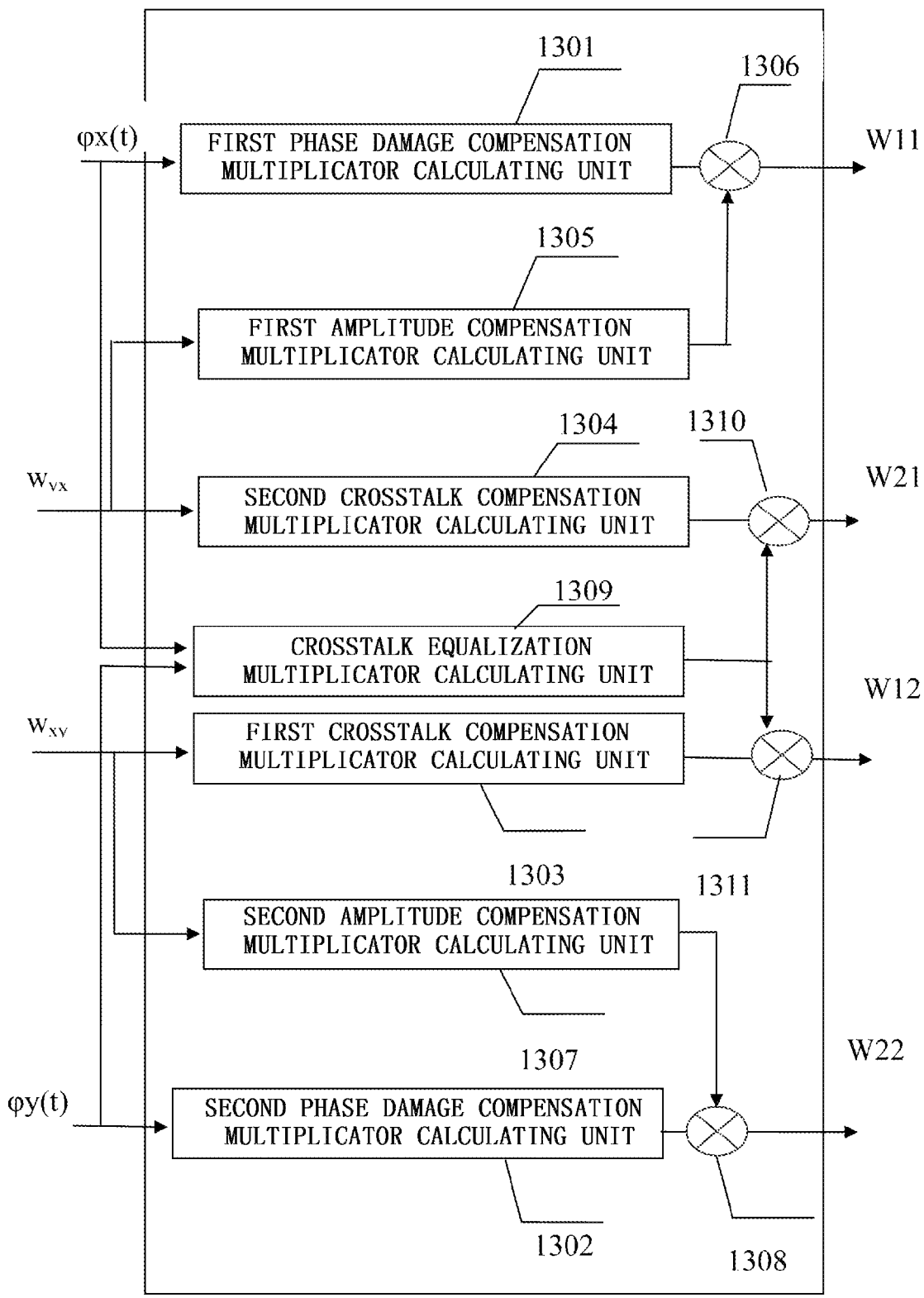
FIG. 15 illustrates a schematic diagram of a multiplicator acquiring unit according to still another embodiment.

FIG. 15 illustrates a schematic diagram of a multiplicator acquiring unit 602 according to still another embodiment.

As compared with the multiplicator acquiring unit 602 illustrated in FIG. 14, the multiplicator acquiring unit 602 illustrated in FIG. 15 further includes a crosstalk equalization multiplicator calculating unit 1309, a multiplier 1310 and a multiplier 1311. Other parts are the same as those illustrated in FIG. 14, and herein are omitted.

The crosstalk equalization multiplicator calculating unit 1309 calculates a crosstalk equalization multiplicator according to first and second phase damage multiplicative parameters. The multiplier 1311 multiplies an output of the first crosstalk compensation multiplicator calculating unit 1303 with the crosstalk equalization multiplicator to acquire the third multiplicator w12. The multiplier 1310 multiplies an output of the second crosstalk compensation multiplicator calculating unit 1304 with the crosstalk equalization multiplicator to acquire the fourth multiplicator w21.

The crosstalk equalization multiplicator calculating unit 1309 for example may calculate the crosstalk equalization multiplicator through an equation $$e^{-j\frac{\varphi_x+\varphi_y}{2}}.$$

Obviously, the embodiment illustrated in FIG. 15 may be modified. For example, the first amplitude compensation multiplicator and/or the second amplitude compensation multiplicator may be not calculated. That is to say, the crosstalk equalization multiplicator calculating unit 1309 and corresponding multiplier are simply combined with the embodiment illustrated in FIG. 13.

The conditions of calculating four multiplicative parameters are described as above, but corresponding multiplicators may also be determined according to similar algorithm in case two, three or more multiplicative parameters are calculated. For example, in case $\phi x$ and $\phi y$ are merely calculated, w11 and w22 may be only calculated. In case $w_{xy}$ and $w_{yx}$ are merely calculated, w12 and w21 may be only calculated. In case $\phi x$, $\phi y$ and $w_{xy}$ are calculated, w11, w22 and w12 may be calculated. Under such condition, the second amplitude compensation multiplicator may also be calculated, etc.

In an embodiment, the multiplicator acquiring unit 602 multiplies the first crosstalk multiplicative parameter $w_{xy}$ with the delayed signal under the second polarization state, and then divides with the delayed signal under the first polarization state; a division result is added with the first phase damage crosstalk multiplicative parameter and then smoothed; the smoothed value is undergone an exponential operation ($e^{-j^*}$, * represents the smoothed value) to acquire a first multiplicator. At the same time, the multiplicator acquiring unit 602 also multiplies the second crosstalk multiplicative parameter $w_{yx}$ with the delayed signal under the first polarization state, and then divides with the delayed signal under the second polarization state; the division result is added with the second phase damage crosstalk multiplicative parameter and then smoothed; the smoothed value is undergone an exponential operation ($e^{-j^*}$, * represents the smoothed value) to acquire a second multiplicator. Please refer to FIG. 20 for an appreciation.

The multiplicative compensating unit 603 is described as follows.

For the convenience of description, a case that the four multiplicators w11, w12, w21 and w22 are calculated is described.

Figure 16:
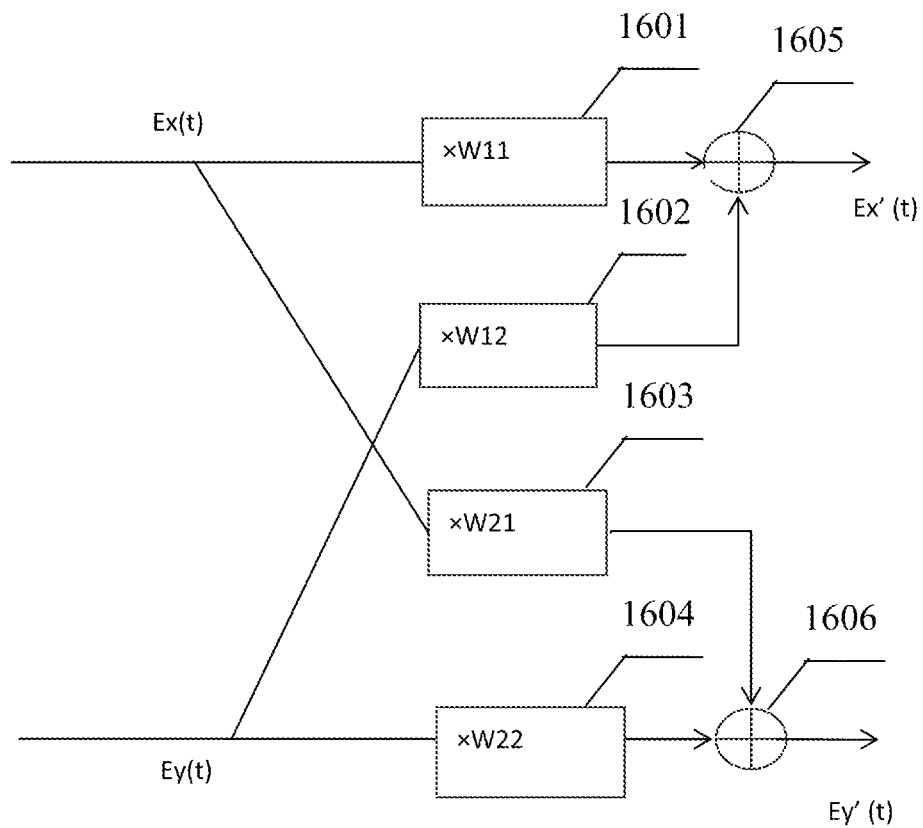
FIG. 16 illustrates a multiplicative compensating unit according to an embodiment.

FIG. 16 illustrates a multiplicative compensating unit 603 according to an embodiment. As illustrated in FIG. 16, the multiplicative compensating unit 603 according to the embodiment includes a first multiplier 1601, a second multiplier 1602, a third multiplier 1603, a fourth multiplier 1604, a first adder 1605 and a second adder 1606.

The signal under the first polarization state is multiplied by the first multiplicator w11 at the first multiplier, and multiplied by the fourth multiplicator w21 at the third multiplier. The signal under the second polarization state is multiplied by the second multiplicator w22 at the fourth multiplier, and multiplied by the third multiplicator w12 at the second multiplier. An output of the second multiplier is added with that of the first multiplier at the first adder 1605 to acquire a compensated signal Ex'(t) under the first polarization state. An output of the third multiplier is added with that of the fourth multiplier at the second adder 1606 to acquire a compensated signal Ex'(t) under the second polarization state.

The implementation of FIG. 16 can be described as a matrix expression $$\begin{bmatrix} E'_x \\ E'_y \end{bmatrix} = \begin{bmatrix} w_{11} & w_{12} \\ w_{21} & w_{22} \end{bmatrix} \begin{bmatrix} E_x \\ E_y \end{bmatrix}.$$

In fact, it is a matrix multiplication, and a matrix $$W = \begin{bmatrix} w_{11} & w_{12} \\ w_{21} & w_{22} \end{bmatrix}$$

is provided by the multiplicator acquiring unit 602. The matrix for example may occur in various forms. The aforementioned embodiments are listed as follows incompletely, and the matrixes that may occur include:

$$\begin{bmatrix} w_{11} & w_{12} \\ w_{21} & w_{22} \end{bmatrix} = \begin{bmatrix} \sqrt{1-|w_{yx}|^2}\, e^{-j\varphi_x} & -jw_{xy} \\ -jw_{yx} & \sqrt{1-|w_{xy}|^2}\, e^{-j\varphi_y} \end{bmatrix}, \quad (1)$$

In which, an amplitude compensation is carried out.

$$\begin{bmatrix} w_{11} & w_{12} \\ w_{21} & w_{22} \end{bmatrix} = \begin{bmatrix} \left(1-\frac{1}{2}|w_{yx}|^2-\frac{1}{8}|w_{yx}|^4+\ldots\right)e^{-j\varphi_x} & -jw_{xy} \\ -jw_{yx} & \left(1-\frac{1}{2}|w_{xy}|^2-\frac{1}{8}|w_{xy}|^4+\ldots\right)e^{-j\varphi_y} \end{bmatrix}, \quad (2)$$

In which, another form of amplitude compensation is carried out.

$$\begin{bmatrix} w_{11} & w_{12} \\ w_{21} & w_{22} \end{bmatrix} = \begin{bmatrix} e^{-j\varphi_x} & -jw_{xy} \\ -jw_{yx} & e^{-j\varphi_y} \end{bmatrix}, \quad (3)$$

In which, no amplitude compensation is carried out.

$$\begin{bmatrix} w_{11} & w_{12} \\ w_{21} & w_{22} \end{bmatrix} = \begin{bmatrix} \sqrt{1-|w_{yx}|^2}\left(1-j\varphi_x-\frac{1}{2}\varphi_x^2+\ldots\right) & -jw_{xy} \\ -jw_{yx} & \sqrt{1-|w_{xy}|^2}\left(1-j\varphi_y-\frac{1}{2}\varphi_y^2+\ldots\right) \end{bmatrix} \quad (4)$$

In which, an amplitude compensation is carried out, and a different algorithm is adopted to calculate the phase compensation multiplier.

$$\begin{bmatrix} w_{11} & w_{12} \\ w_{21} & w_{22} \end{bmatrix} = \begin{bmatrix} \left(1 - \frac{1}{2}|w_{yx}|^2 - \frac{1}{8}|w_{yx}|^4 + \ldots\right)\left(1 - j\varphi_x - \frac{1}{2}\varphi_x^2 + \ldots\right) & -jw_{xy} \\ -jw_{yx} & \left(1 - \frac{1}{2}|w_{xy}|^2 - \frac{1}{8}|w_{xy}|^4 + \ldots\right)\left(1 - j\varphi_y - \frac{1}{2}\varphi_y^2 + \ldots\right) \end{bmatrix}, \quad (5)$$

$$\begin{bmatrix} w_{11} & w_{12} \\ w_{21} & w_{22} \end{bmatrix} = \begin{bmatrix} 1 - j\varphi_x & -jw_{xy} \\ -jw_{yx} & 1 - j\varphi_y \end{bmatrix} \quad (6)$$

$$\begin{bmatrix} w_{11} & w_{12} \\ w_{21} & w_{22} \end{bmatrix} = e^{-j\frac{\varphi_x+\varphi_y}{2}} \begin{bmatrix} \sqrt{1-|w_{yx}|^2}\, e^{-j\frac{\varphi_x-\varphi_y}{2}} & -jw_{xy} \\ -jw_{yx} & \sqrt{1-|w_{xy}|^2}\, e^{-j\frac{\varphi_y-\varphi_x}{2}} \end{bmatrix}, \quad (7)$$

In which, a crosstalk equalization is carried out, so as to realize power conservation and improve the performance.

The above descriptions are just exemplary, instead of limitations. In case there are only a few multiplicators, such as only w11 and w22, other multiplicators may be regarded as 1 to construct the matrix. Other cases (e.g., there are only w12 and w21) are treated similarly.

Figure 17:
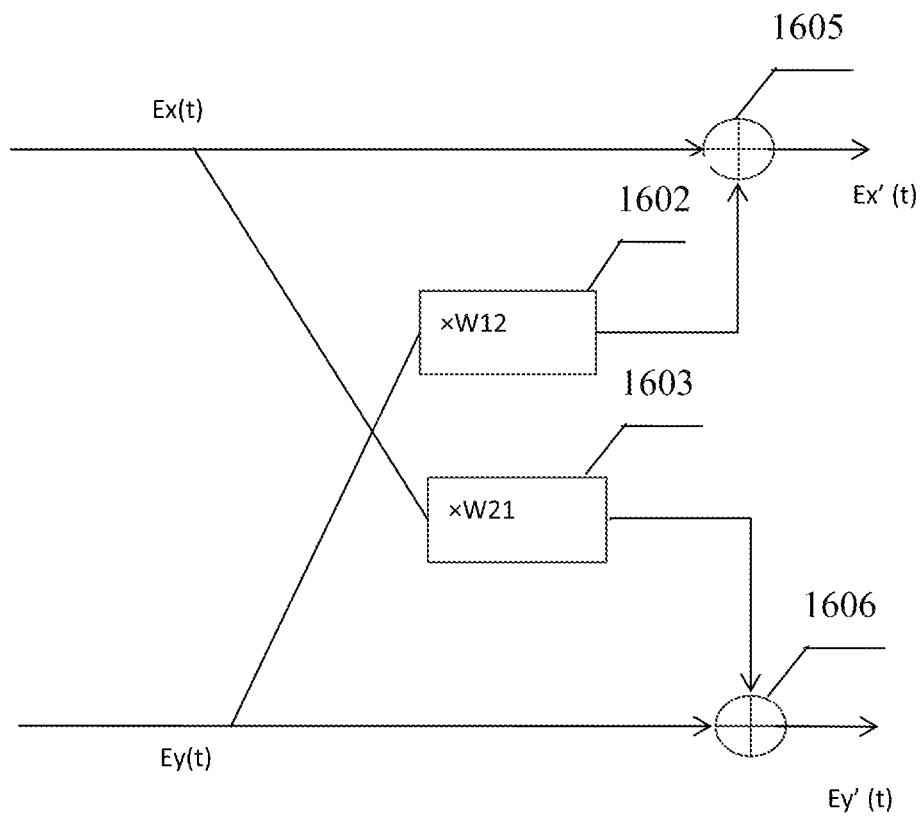
FIG. 17 illustrates a schematic diagram of a multiplicative compensating unit in case only two parameters w12 and w21 are calculated.

FIG. 17 illustrates a schematic diagram of a multiplicative compensating unit 603 in case only two parameters w12 and w21 are calculated. As illustrated in FIG. 17, a signal under the first polarization state is multiplied by the fourth multiplicator w21 at the third multiplier 1603, a signal under the second polarization state is multiplied by the third multiplicator w12 at the second multiplier 1602, and an output of the second multiplier is added with the signal under the first polarization state at the first adder, so as to acquire a compensated signal under the first polarization state. An output of the third multiplier is added with the signal under the second polarization state at the second adder, so as to acquire a compensated signal under the second polarization state.

Other multiplicators may be calculated partially in a similar way.

Figure 18:
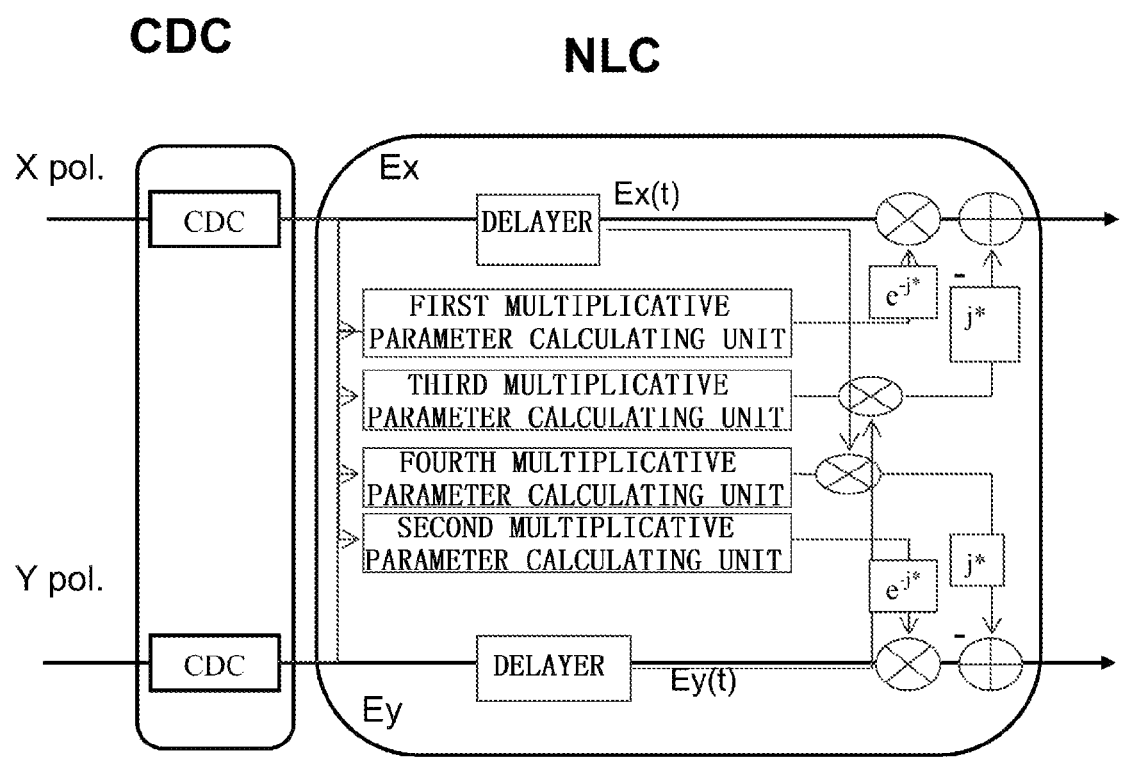
FIG. 18 illustrates a structural diagram of a BP unit using the NLC unit according to an embodiment.

FIG. 18 illustrates a schematic structural diagram of a BP unit using one embodiment as described above, in which a delayer is configured to synchronize signals input to the two multipliers in the drawing, and may be omitted in certain embodiments. In the above embodiment, the multiplicators w11, w12, w21 and w22 generated by the multiplicator generating unit 602 constitute the condition as expressed in Equation 3.

The multiplicative parameter calculating units in the drawing may be implemented in the aforementioned various ways.

Figure 19:
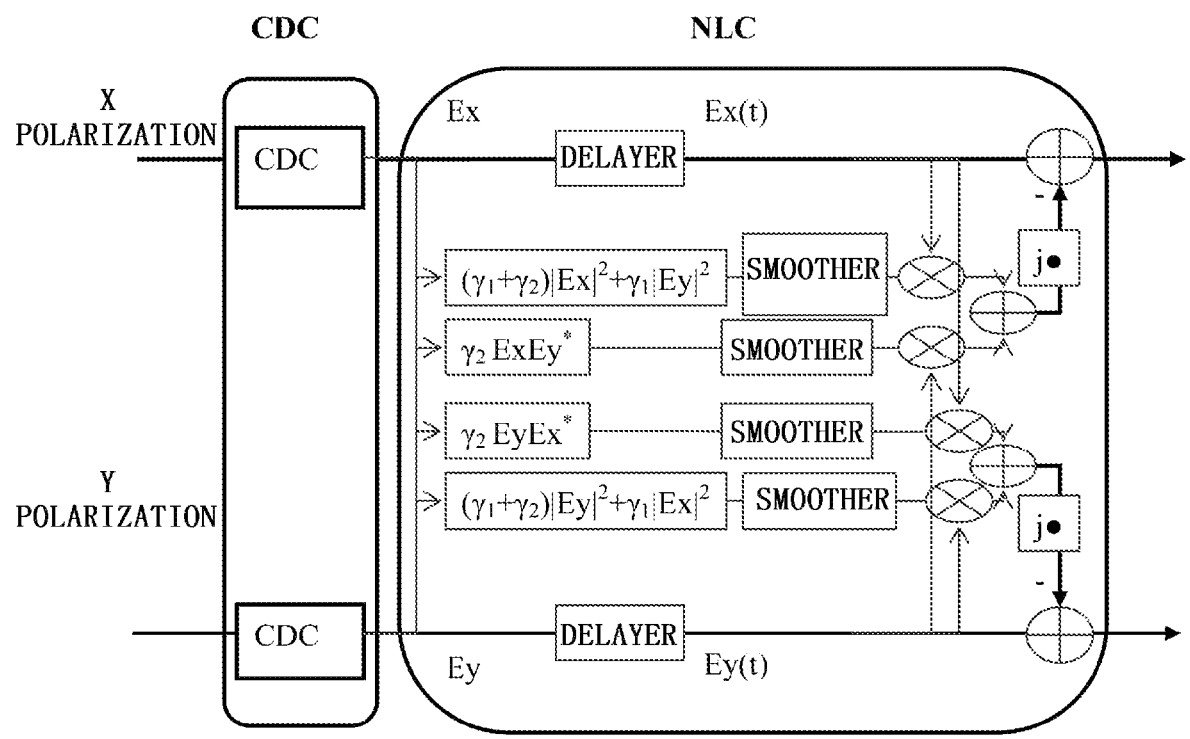
FIG. 19 illustrates a structural diagram of a BP unit using the NLC unit according to another embodiment.

FIG. 19 illustrates a structural diagram of a BP unit using another embodiment as described above, in which the multiplicators w11, w12, w21 and w22 generated by the multiplicator acquiring unit 602 constitute the condition as expressed in Equation 6.

Figure 20:
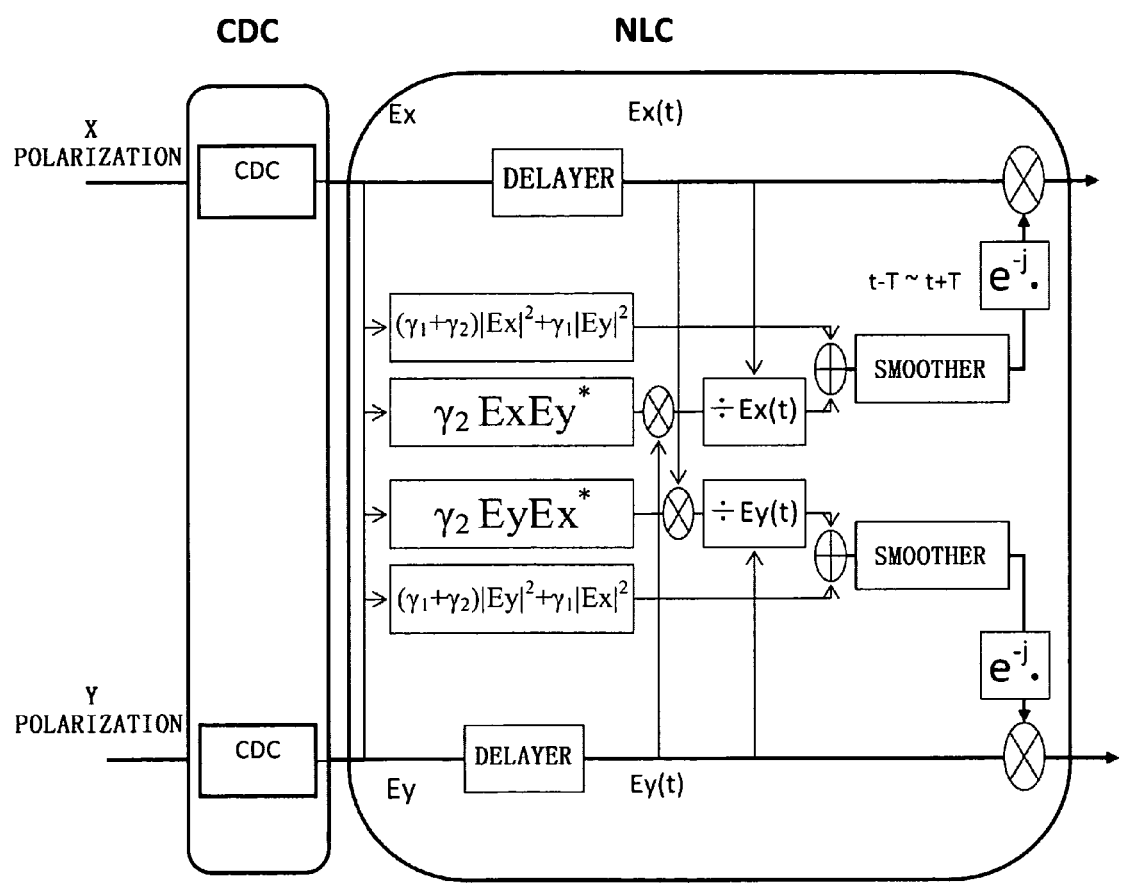
FIG. 20 illustrates a structural diagram of a BP unit using the NLC unit according to still another embodiment.

FIG. 20 illustrates a structural diagram of a BP unit using still another embodiment as described above, in which the multiplicator acquiring unit 602 multiplies the first crosstalk multiplicative parameter with the delayed signal under the second polarization state and then divides with the delayed signal under the first polarization state; the division result is added with the first phase damage crosstalk multiplicative parameter and then smoothed; the smoothed value is undergone an exponential operation ($e^{-j*}$, * represents the smoothed value) to acquire a first multiplicator. At the same time, the multiplicator acquiring unit 602 multiplies the second crosstalk multiplicative parameter with the delayed signal under the first polarization state, and then divides with the delayed signal under the second polarization state; the division result is added with the second phase damage crosstalk multiplicative parameter and then smoothed; a smoothed value undergoes an exponential operation ($e^{-j*}$, * represents the smoothed value) to acquire a second multiplicator. The multiplicative compensating unit 603 multiplies it with the delayed signal under the second polarization state (corresponding to supplementing 0 to the positions of w12 and w21 in a matrix W). The smoother in the drawing may be cancelled. In addition, it is undoubted that the output of the phase damage calculating unit and the output of the nonlinear crosstalk calculating unit, which are expressed in equations in the drawing, can be smoothed.

The generated multiplicators w11, w12, w21 and w22 constitute the condition as expressed in Equation 6.

Figure 21:
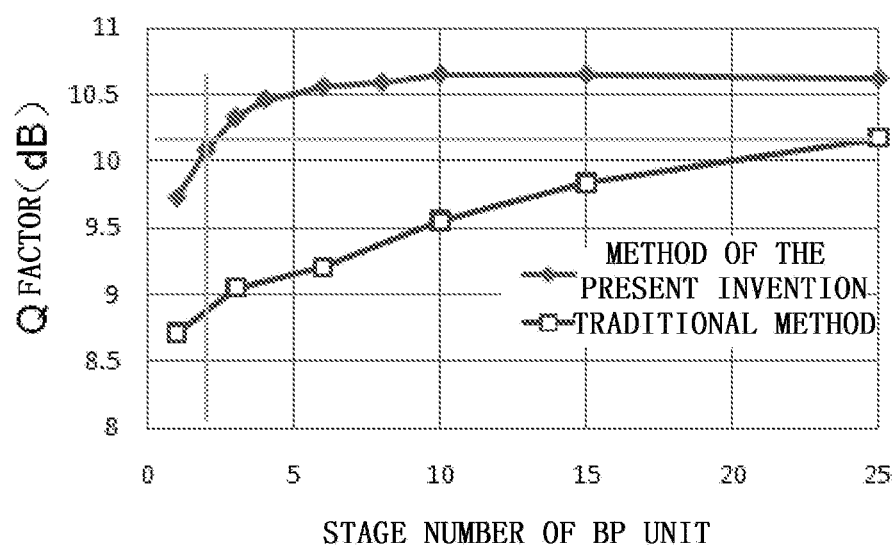
FIG. 21 illustrates a comparison of performances in a typical long-haul coherent optical propagation system when the apparatus for nonlinear compensation illustrated in FIG. 18 and a traditional apparatus for nonlinear compensation are applied respectively.

FIG. 21 illustrates a comparison of performances in a typical long-haul coherent optical propagation system when an apparatus for nonlinear compensation illustrated in FIG. 18 (the multiplicative parameter calculator unit is composed as illustrated in FIG. 8) and a traditional apparatus for nonlinear compensation are applied respectively. It can be seen that the method of the embodiment only requires 2-stage apparatus for nonlinear compensation to achieve the performance of the 25-stage apparatus for nonlinear compensation used in the traditional method. The complexity is decreased to be 10% of the original complexity.

Figure 22:
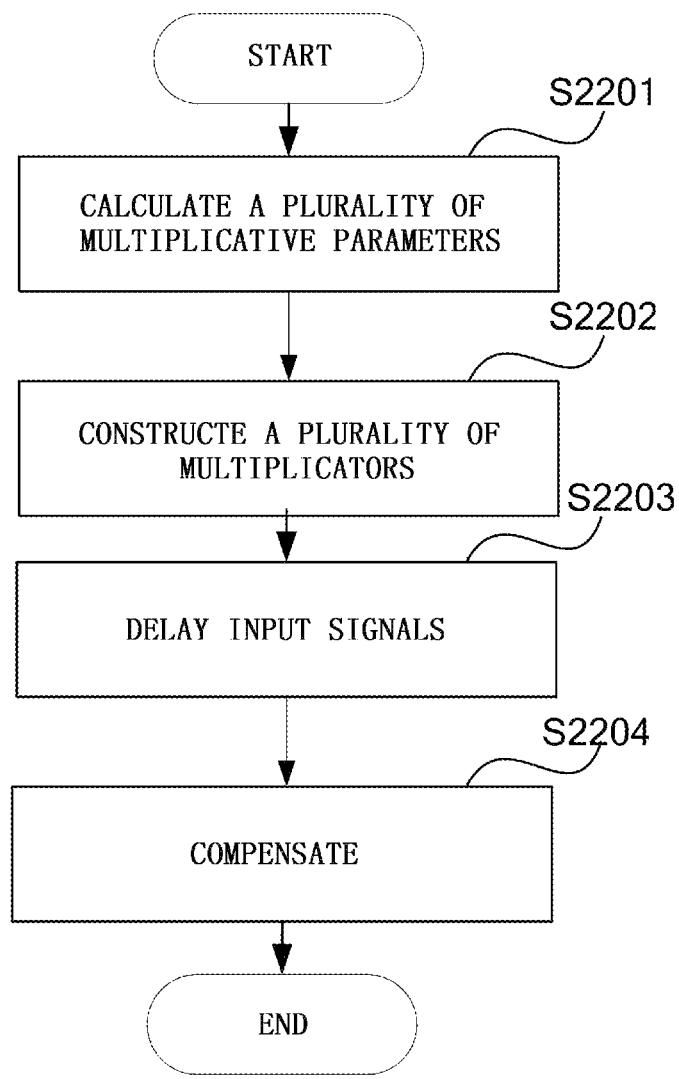
FIG. 22 illustrates a flowchart of a method for compensating the nonlinear damage according to an embodiment.

FIG. 22 illustrates a flowchart of a method for compensating the nonlinear damage according to an embodiment. As illustrated in FIG. 22, firstly, in step S2201, a plurality of multiplicative parameters are calculated according to input signals. Next, in step S2202, a plurality of multiplicators are constructed by using the plurality of multiplicative parameters. Meanwhile, in step S2203, the input signals are delayed. The delay time is adaptive to the processing time in steps S2201 and S2202. The delay step sometimes may be omitted. Finally, in step S2204, the input signals are compensated by using the plurality of multiplicators.

In a preferred embodiment, one or more of the plurality of multiplicative parameters are acquired by using time-domain signals in two polarization states of the input signals.

Please refer to the descriptions of units 601 to 603 for the detailed processing.

In the embodiments herein, the multiplicative parameters refer to parameters used to describe the nonlinear damage, and the multiplicators can be acquired by using these parameters. The multiplicators refer to numerals that eliminate the nonlinear damage by constructing a matrix and being multiplied by the input signal. The matrix construction includes forming a matrix after a complementation, and the complementation means setting the positions having no multiplicators in the matrix to be 1 or 0.

To be noted, the nonlinear damage calculator (multiplicative parameter calculating unit) is configured to calculate magnitudes of various nonlinear damages. Its output may be used either as an input to the nonlinear damage eliminator to compensate the nonlinear damage, or for other purposes such as monitoring the state of a propagation system, and even used in a simulation tool of the propagation system to simulate the influence of the nonlinear effect.

Figure 23:
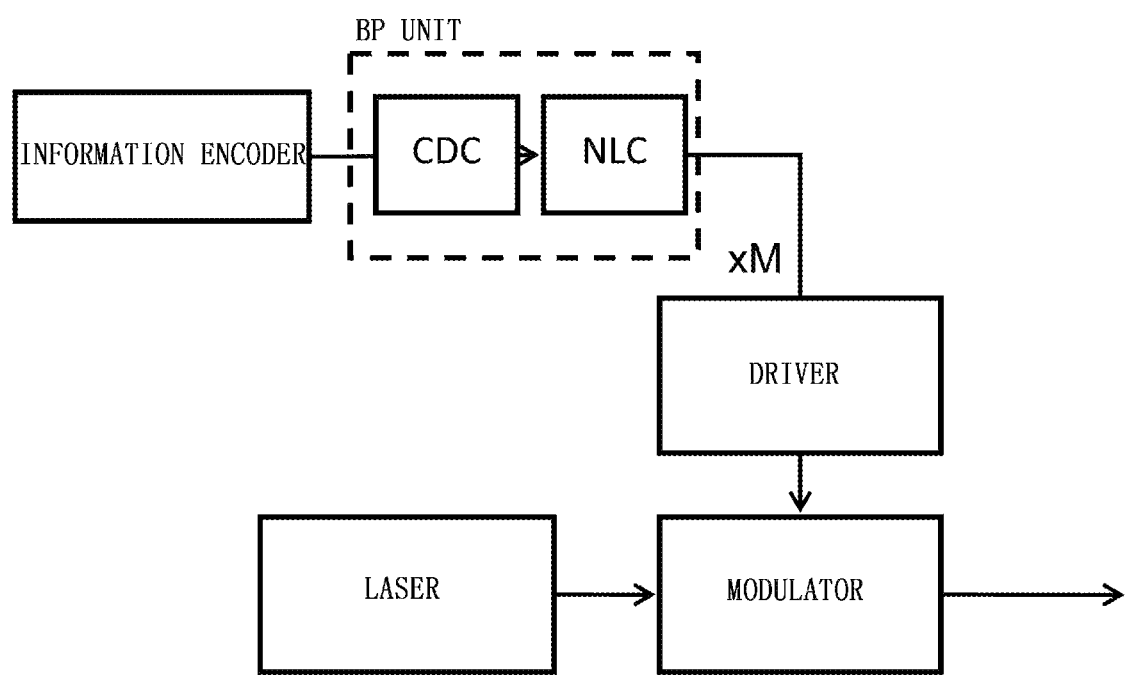
FIG. 23 illustrates the position of the BP unit in a transmitter.

The BP unit may be further used in a transmitter. FIG. 23 illustrates the position of the BP unit in the transmitter.

In the descriptions of the embodiments, the descriptions of methods and steps are helpful to appreciate apparatuses and units, and the descriptions of apparatuses and units are helpful to appreciate methods and steps.

Therefore, in summary, the discussion at least discloses the embodiments of the following excursuses.

Excursus 1: A method for compensating nonlinear damage, the method being used in a dual-polarization communication system, the method comprising:

calculating, according to input time-domain signals, a plurality of multiplicative parameters indicative of nonlinear damages to the input signals;

constructing a plurality of multiplicators by using the plurality of multiplicative parameters;

delaying the input time-domain signals; and compensating the delayed input time-domain signals by using the plurality of multiplicators.

Excursus 2: The method for compensating nonlinear damage according to Excursus 1, wherein one or more of the plurality of multiplicative parameters are obtained by using signals of the input time-domain signals in two polarization states.

Excursus 3: The method for compensating nonlinear damage according to Excursus 2, wherein the one or more of the plurality of multiplicative parameters comprise a multiplicative parameter for polarization crosstalk from the signals under a first polarization state to the signals under a second polarization state and/or a multiplicative parameter for polarization crosstalk from the signals under the second polarization state to the signals under the first polarization state.

Excursus 4: The method for compensating nonlinear damage according to Excursus 1, wherein the step of calculating multiplicative parameters comprises:

calculating the damage to the phase of the signals of the input time-domain signals under the first polarization state, as a first multiplicative parameter;

calculating the damage to the phase of the signals of the input time-domain signals under the second polarization state, as a second multiplicative parameter;

calculating a polarization crosstalk from the signals under the first polarization state to the signals under the second polarization state, as a third multiplicative parameter;

calculating a polarization crosstalk from the signals under the second polarization state to the signals under the first polarization state, as a fourth multiplicative parameter.

Excursus 5: The method for compensating nonlinear damage according to Excursus 4, wherein the first to the fourth multiplicative parameters are calculated as follows:

obtaining the square of the modulo of the signals under the first polarization state;

obtaining the square of the modulo of the signals under the second polarization state;

obtaining the conjugation of the signals under the first polarization state;

obtaining the conjugation of the signals under the second polarization state;

obtaining the first multiplicative parameter by adding the product of the square of the modulo of the signals under the first polarization state and a first coefficient to the product of the square of the modulo of the signals under the second polarization state and a second coefficient;

obtaining the second multiplicative parameter by adding the product of the square of the modulo of the signals under the second polarization state and a third coefficient to the product of the square of the modulo of the signals under the first polarization state and a fourth coefficient;

obtaining the third multiplicative parameter by multiply the product of the signals under the first polarization state and the conjugation of the signals under the second polarization state by a non-zero fifth coefficient; and obtaining the fourth multiplicative parameter by multiply the product of the signals under the second polarization state and the conjugation of the signals under the first polarization state by a non-zero sixth coefficient.

Excursus 6: The method for compensating nonlinear damage according to Excursus 5, wherein the first coefficient equals to the third coefficient, the second coefficient equal to the fourth coefficient, and the fifth coefficient equals to the sixth coefficient.

Excursus 7: The method for compensating nonlinear damage according to Excursus 6, wherein the first coefficient equals to the sum of the second coefficient and the fifth coefficient.

Excursus 8: The method for compensating nonlinear damage according to Excursus 4, wherein the first to the fourth multiplicative parameters are calculated as follows:

obtaining the square of the modulo of the signals under the first polarization state;

obtaining the square of the modulo of the signals under the second polarization state;

obtaining the conjugation of the signals under the first polarization state;

obtaining the conjugation of the signals under the second polarization state;

obtaining the first multiplicative parameter by multiplying the square of the modulo of the signals under the first polarization state by a first coefficient;

obtaining the second multiplicative parameter by multiplying the square of the modulo of the signals under the second polarization state by a second coefficient;

obtaining the third multiplicative parameter by multiply the product of the signals under the first polarization state and the conjugation of the signals under the second polarization state by a non-zero third coefficient; and obtaining the fourth multiplicative parameter by multiply the product of the signals under the second polarization state and the conjugation of the signals under the first polarization state by a non-zero fourth coefficient.

Excursus 9: The method according to Excursus 4, further comprising:

smoothing the first multiplicative parameter;

smoothing the second multiplicative parameter;

smoothing the third multiplicative parameter; and smoothing the fourth multiplicative parameter.

Excursus 10: The method according to Excursus 9, wherein each of the smoothing is carried out using a weighted averager, a digital filter or a frequency-domain filer.

Excursus 11: The method according to Excursus 4, wherein the constructing comprising:

constructing a first phase damage compensating multiplicator according to the first multiplicative parameter, the first phase damage compensating multiplicator being a multiplicator for compensating the phase of the signals under the first polarization state;

constructing a second phase damage compensating multiplicator according to the second multiplicative parameter, the second phase damage compensating multiplicator being a multiplicator for compensating the phase of the signals under the second polarization state;

constructing a first crosstalk compensating multiplicator according to the third multiplicative parameter, the first crosstalk compensating multiplicator being used as a multiplicator for compensating the crosstalk from the signals under the second polarization state to the signals under the first polarization state; and constructing a second crosstalk compensating multiplicator according to the fourth multiplicative parameter, the second crosstalk compensating multiplicator being used as a multiplicator for compensating the crosstalk from the signals under the first polarization state to the signals under the second polarization state.

Excursus 12: The method according to Excursus 11, wherein the constructing further comprising:

constructing a first amplitude damage compensating multiplicator according to the first multiplicative parameter and the third multiplicative parameter, the first amplitude damage compensating multiplicator being a multiplicator for compensating the amplitude of the signals under the first polarization state; and constructing a second amplitude damage compensating multiplicator according to the second multiplicative parameter and the fourth multiplicative parameter, the second amplitude damage compensating multiplicator being a multiplicator for compensating the amplitude of the signals under the second polarization state.

Excursus 13: The method according to Excursus 4, wherein the constructing comprising:

multiplying the third multiplicative parameter by delayed signals under the second polarization state and dividing with delayed signals under the first polarization state, adding the divided result to the first multiplicative parameter, then smoothing and exponentially calculating $e^{-j*}$ the smoothed value, and taking the result of operation as a first multiplicator, where, * represents the smoothed value; and multiplying the fourth multiplicative parameter by delayed signals under the first polarization state and dividing with delayed signals under the second polarization state, adding the divided result to the second multiplicative parameter, then smoothing and exponentially calculating $e^{-j*}$ the smoothed value, and taking the result of operation as a second multiplicator.

Excursus 14: The method according to Excursus 1, wherein in the compensating, the plurality of multiplicators are used to construct a matrix, and the matrix is multiplied by the delayed input signals to compensate the input signals.

Excursus 15: An apparatus for compensating nonlinear damage, the apparatus being used in a dual-polarization communication system, the apparatus comprising:

a multiplicative parameter calculating unit configured to calculate a plurality of multiplicative parameters according to input time-domain signals, the multiplicative parameters being parameters indicative of nonlinear damages to the input signals;

a multiplicator constructing unit configured to construct a plurality of multiplicators by using the plurality of multiplicative parameters;

a delaying unit configured to delay the input time-domain signals; and a compensating unit configured to compensate the delayed input time-domain signals using the plurality of multiplicators.

Excursus 16: The apparatus for compensating nonlinear damage according to Excursus 14, wherein the multiplicative parameter calculating unit comprising:

a first polarization state phase damage calculating unit configured to calculate a phase damage to signals under a first polarization state of the input time-domain signals, as a first multiplicative parameter;

a second polarization state phase damage calculating unit configured to calculate a phase damage to signals under a second polarization state of the input time-domain signals, as a second multiplicative parameter;

a first polarization crosstalk calculating unit configured to calculate a polarization crosstalk from the signals under the first polarization state to the signals under the second polarization state, as a third multiplicative parameter; and a second polarization crosstalk calculating unit configured to calculate a polarization crosstalk from the signals under the second polarization state to the signals under the first polarization state, as a fourth multiplicative parameter.

Excursus 17: The apparatus according to Excursus 16, wherein the multiplicator constructing unit is configured to:

construct a first phase damage compensating multiplicator according to the first multiplicative parameter, the first phase damage compensating multiplicator being a multiplicator for compensating the phase of the signals under the first polarization state;

construct a second phase damage compensating multiplicator according to the second multiplicative parameter, the second phase damage compensating multiplicator being a multiplicator for compensating the phase of the signals under the second polarization state;

construct a first crosstalk compensating multiplicator according to the third multiplicative parameter, the first crosstalk compensating multiplicator being used as a multiplicator for compensating the crosstalk from the signals under the second polarization state to the signals under the first polarization state; and construct a second crosstalk compensating multiplicator according to the fourth multiplicative parameter, the second crosstalk compensating multiplicator being used as a multiplicator for compensating the crosstalk from the signals under the first polarization state to the signals under the second polarization state.

Excursus 18: The apparatus according to Excursus 17, wherein the multiplicator constructing unit is further configured to:

construct a first amplitude damage compensating multiplicator according to the first multiplicative parameter and the third multiplicative parameter, the first amplitude damage compensating multiplicator being a multiplicator for compensating the amplitude of the signals under the first polarization state; and construct a second amplitude damage compensating multiplicator according to the second multiplicative parameter and the fourth multiplicative parameter, the second amplitude damage compensating multiplicator being a multiplicator for compensating the amplitude of the signals under the second polarization state.

Excursus 19: The apparatus according to Excursus 16, wherein the multiplicator constructing unit is configured to:

multiply the third multiplicative parameter by delayed signals under the second polarization state and divide with delayed signals under the first polarization state, add the divided result to the first multiplicative parameter, then smooth and exponentially calculate $e^{-j*}$ the smoothed value, and take the result of operation as a first multiplicator, where, * represents the smoothed value; and multiply the fourth multiplicative parameter by delayed signals under the first polarization state and divide with delayed signals under the second polarization state, add the divided result to the second multiplicative parameter, then smooth and exponentially calculate $e^{-j*}$ the smoothed value, and take the result of operation as a second multiplicator.

The above apparatus and method can be implemented by hardware, or a combination of hardware and software. The embodiments relate to such a logic part readable program that enables a logic part to implement the previously described apparatuses or components, or implement the previously described methods and steps, when the program is executed by the logic part. The logic part for example may be field programmable logic part, microprocessor, computer processor, etc. The present invention also relates to storage medium for storing the above program, e.g., hard disk, magnetic disk, optical disk, DVD, flash, magnetic optical disc, memory card, memory stick, etc.

The system is described in conjunction with the above detailed embodiments. But a person skilled in the art shall be clear that the descriptions are just exemplary, instead of limitations to the protection scope. A person skilled in the art can make various modifications and changes to the present invention based on spirit and principle of the present invention, and those modifications and changes also fall within the scope of the present invention.

What is claimed is:

1. A method for compensating nonlinear damage, the method being used in a dual-polarization communication system, the method comprising:
    calculating, according to input time-domain signals, a plurality of multiplicative parameters indicative of nonlinear damages to the input signals, comprising:
        calculating damage to the phase of signals of the input time-domain signals under the first polarization state, as a first multiplicative parameter;
        calculating damage to the phase of signals of the input time-domain signals under the second polarization state, as a second multiplicative parameter;
        calculating a polarization crosstalk from signals under the first polarization state to signals under the second polarization state, as a third multiplicative parameter; and
        calculating a polarization crosstalk from the signals under the second polarization state to the signals under the first polarization state, as a fourth multiplicative parameter;
    constructing a plurality of multiplicators by using the plurality of multiplicative parameters;
    compensating the input time-domain signals by using the plurality of multiplicators;
    smoothing the first multiplicative parameter;
    smoothing the second multiplicative parameter;
    smoothing the third multiplicative parameter; and
    smoothing the fourth multiplicative parameter.

2. The method according to claim 1, wherein one or more of the plurality of multiplicative parameters are obtained by using signals of the input time-domain signals in two polarization states.

3. The method according to claim 2, wherein the one or more of the plurality of multiplicative parameters comprise a multiplicative parameter for polarization crosstalk from signals under a first polarization state to signals under a second polarization state and/or a multiplicative parameter for polarization crosstalk from the signals under the second polarization state to the signals under the first polarization state.

4. The method according to claim 1, wherein
the first to the fourth multiplicative parameters are calculated as follows:
    obtaining a square of a modulo of the signals under the first polarization state;
    obtaining a square of a modulo of the signals under the second polarization state;
    obtaining a conjugation of the signals under the first polarization state;
    obtaining a conjugation of the signals under the second polarization state;
    obtaining the first multiplicative parameter by adding a product of the square of the modulo of the signals under the first polarization state and a first coefficient to a product of the square of the modulo of the signals under the second polarization state and a second coefficient;
    obtaining the second multiplicative parameter by adding the product of the square of the modulo of the signals under the second polarization state and a third coefficient to the product of the square of the modulo of the signals under the first polarization state and a fourth coefficient;
    obtaining the third multiplicative parameter by multiplying the product of the signals under the first polarization state and the conjugation of the signals under the second polarization state by a non-zero fifth coefficient; and
    obtaining the fourth multiplicative parameter by multiplying the product of the signals under the second polarization state and the conjugation of the signals under the first polarization state by a non-zero sixth coefficient.

5. The method according to claim 4, wherein
the first coefficient equals to the third coefficient, the second coefficient equals to the fourth coefficient, and the fifth coefficient equals to the sixth coefficient.

6. The method of nonlinear damage compensation according to claim 5, wherein
the first coefficient equals a sum of the second coefficient and the fifth coefficient.

7. The method according to claim 1, wherein
the first to the fourth multiplicative parameters are calculated as follows:
    obtaining the square of the modulo of the signals under the first polarization state;
    obtaining the square of the modulo of the signals under the second polarization state;
    obtaining the conjugation of the signals under the first polarization state;
    obtaining the conjugation of the signals under the second polarization state;
    obtaining the first multiplicative parameter by multiplying the square of the modulo of the signals under the first polarization state by a first coefficient;
    obtaining the second multiplicative parameter by multiplying the square of the modulo of the signals under the second polarization state by a second coefficient;
    obtaining the third multiplicative parameter by multiplying a product of the signals under the first polarization state and the conjugation of the signals under the second polarization state by a non-zero third coefficient; and
    obtaining the fourth multiplicative parameter by multiplying a product of the signals under the second polarization state and the conjugation of the signals under the first polarization state by a non-zero fourth coefficient.

8. The method according to claim 1, wherein each of the smoothing is carried out using a weighted averager, a digital filter or a frequency-domain filer.

9. The method according to claim 1, wherein the constructing comprising:
constructing a first phase damage compensating multiplicator according to the first multiplicative parameter, the first phase damage compensating multiplicator being a multiplicator for compensating the phase of the signals under the first polarization state;
constructing a second phase damage compensating multiplicator according to the second multiplicative parameter, the second phase damage compensating multiplicator being a multiplicator for compensating the phase of the signals under the second polarization state;
constructing a first crosstalk compensating multiplicator according to the third multiplicative parameter, the first crosstalk compensating multiplicator being used as a multiplicator for compensating the crosstalk from the signals under the second polarization state to the signals under the first polarization state; and
constructing a second crosstalk compensating multiplicator according to the fourth multiplicative parameter, the second crosstalk compensating multiplicator being used as a multiplicator for compensating the crosstalk from the signals under the first polarization state to the signals under the second polarization state.

10. The method according to claim 9, wherein the constructing further comprising:
constructing a first amplitude damage compensating multiplicator according to the first multiplicative parameter and the third multiplicative parameter, the first amplitude damage compensating multiplicator being a multiplicator for compensating the amplitude of the signals under the first polarization state; and
constructing a second amplitude damage compensating multiplicator according to the second multiplicative parameter and the fourth multiplicative parameter, the second amplitude damage compensating multiplicator being a multiplicator for compensating the amplitude of the signals under the second polarization state.

11. The method according to claim 1, wherein the constructing comprising:
multiplying the third multiplicative parameter by delayed signals under the second polarization state and dividing with delayed signals under the first polarization state, adding the divided result to the first multiplicative parameter, then smoothing the added result and exponentially calculating the smoothed value, and taking the result of operation $e^{-j*}$ as a first multiplicator, where, * represents the smoothed value, j represents an imaginary part; and
multiplying the fourth multiplicative parameter by delayed signals under the first polarization state and dividing with delayed signals under the second polarization state, adding the divided result to the second multiplicative parameter, then smoothing and exponentially calculating $e^{-j*}$ the smoothed value, and taking the result of operation as a second multiplicator.

12. The method according to claim 1, wherein in the compensating, the plurality of multiplicators are used to construct a matrix, and the matrix is multiplied by the delayed input signals to compensate the input signals which are delayed.

13. An apparatus for compensating nonlinear damage, the apparatus being used in a dual-polarization communication system, the apparatus comprising:
a multiplicative parameter calculating unit configured to calculate a plurality of multiplicative parameters according to input time-domain signals, the multiplicative parameters being parameters indicative of nonlinear damage to the input signals, comprising:
calculating damage to the phase of signals of the input time-domain signals under the first polarization state, as a first multiplicative parameter;
calculating damage to the phase of signals of the input time-domain signals under the second polarization state, as a second multiplicative parameter;
calculating a polarization crosstalk from signals under the first polarization state to signals under the second polarization state, as a third multiplicative parameter; and
calculating a polarization crosstalk from the signals under the second polarization state to the signals under the first polarization state, as a fourth multiplicative parameter;
a multiplicator constructing unit configured to construct a plurality of multiplicators by using the plurality of multiplicative parameters;
a compensating unit configured to compensate the input time-domain signals by using the plurality of multiplicators;
smoothing the first multiplicative parameter;
smoothing the second multiplicative parameter;
smoothing the third multiplicative parameter; and
smoothing the fourth multiplicative parameter.

* * * * *